US012676774B2

(12) United States Patent
Huang et al.

(10) Patent No.: US 12,676,774 B2
(45) Date of Patent: Jul. 7, 2026

(54) CHANNEL ESTIMATION METHOD, APPARATUS, AND STORAGE MEDIUM

(71) Applicant: DATANG MOBILE COMMUNICATIONS EQUIPMENT CO., LTD., Beijing (CN)

(72) Inventors: Qiuping Huang, Beijing (CN); Xin Su, Beijing (CN)

(73) Assignee: DATANG MOBILE EQUIPMENT CO., LTD., Beijing (CN)

( * ) Notice: Subject to any disclaimer, the term of this patent is extended or adjusted under 35 U.S.C. 154(b) by 420 days.

(21) Appl. No.: 18/033,354

(22) PCT Filed: Oct. 25, 2021

(86) PCT No.: PCT/CN2021/126209
§ 371 (c)(1),
(2) Date: Apr. 24, 2023

(87) PCT Pub. No.: WO2022/083783
PCT Pub. Date: Apr. 28, 2022

(65) Prior Publication Data
US 2024/0031201 A1    Jan. 25, 2024

(30) Foreign Application Priority Data

Oct. 23, 2020    (CN) .......................... 202011149123.3

(51) Int. Cl.
*H04L 25/02* (2006.01)
*H04B 7/06* (2006.01)
*H04L 5/00* (2006.01)

(52) U.S. Cl.
CPC ..... *H04L 25/0204* (2013.01); *H04B 7/06968* (2023.05); *H04L 5/0051* (2013.01); *H04L 25/0224* (2013.01)

(58) Field of Classification Search
None
See application file for complete search history.

(56) References Cited

U.S. PATENT DOCUMENTS

| | | | | |
|---|---|---|---|---|
| 2015/0016369 A1* | 1/2015 | Park | ...................... | H04L 1/1861 |
| | | | | 370/329 |
| 2023/0130150 A1* | 4/2023 | Shahmohammadian | .................... | |
| | | | | H04B 7/024 |
| | | | | 370/329 |
| 2024/0267165 A1* | 8/2024 | Liu | ........................ | H04L 5/0005 |

FOREIGN PATENT DOCUMENTS

| | | |
|---|---|---|
| CN | 109392144 A | 2/2019 |
| CN | 111757500 A | 10/2020 |

(Continued)

OTHER PUBLICATIONS

CATT,"Discussion on enhancements on HST-SFN deployment",3GPP TSG RAN WG1 #102-e, e-Meeting, Aug. 17-28, 2020, total 8 pages, R1-2005687.

(Continued)

*Primary Examiner* — Luna Weissberger
(74) *Attorney, Agent, or Firm* — KILPATRICK TOWNSEND & STOCKTON LLP

(57) ABSTRACT

The present application provides a channel estimation method, apparatus, and a storage medium. The channel estimation method includes: receiving indication information transmitted by a network device, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and performing, according to the indication infor- (Continued)

mation, channel estimation of the first signal based on the plurality of first reference signals. In embodiments of the present application, a result of channel estimation by a terminal device is relatively accurate, thus improving the performance of signal demodulation.

16 Claims, 3 Drawing Sheets

(56) References Cited

FOREIGN PATENT DOCUMENTS

| WO | 2018059458 | A1 | 4/2018 | | |
|----|------------|-----|---------|-------------|
| WO | 2019235906 | A1 | 12/2019 | | |
| WO | WO-2022043918 | A1 * | 3/2022 | ............. | H04L 5/005 |

OTHER PUBLICATIONS

Huawei et al., "Enhancements on Multi-TRP for high speed train in Rel-17", 3GPP TSG RAN WG1 Meeting #102-e, E-meeting, Aug. 17-28, 2020, total 4 pages, R1-2006394.

Qualcomm Incorporated,"Enhancements on HST-SFN deployment ", 3GPP TSG-RAN WG1 Meeting #102-e, e-Meeting, Aug. 17-28, 2020, total 15 pages, R1-2006794.

Nokia et al., "Enhancements for HST-SFN deployment", 3GPP TSG RAN WG1 #102-e Meeting, e-Meeting, Aug. 17-28, 2020, total 7 pages, R1-2006847.

European Patent Office, Extended European Search Report Issued in Application No. 21882195.7, Sep. 11, 2024, Germany, 10 pages.

Vivo, "Evaluation and discussion on HST-SFN schemes", 3GPP TSG RAN WG1 #102-e, e-Meeting, Aug. 17-28, 2020, total 10 pages, R1-2005367.

State Intellectual Property Office of the People's Republic of China, first office Action Issued in Application No. 202011149123.3, Jun. 3, 2023, 15 pages.

Ericsson, "Transmission scheme in NR PDSCH demodulation requirements for HST", 3GPP TSG-RAN WG4 Meeting #94-e, Electronic, Meeting, Mar. 24-6, 2020, total 5 pages, R4-2001357.

* cited by examiner

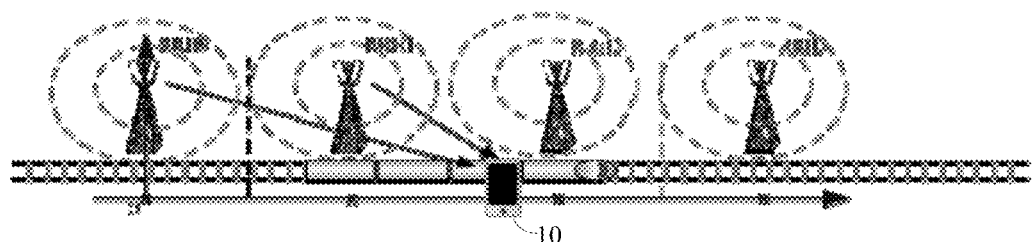

FIG. 1

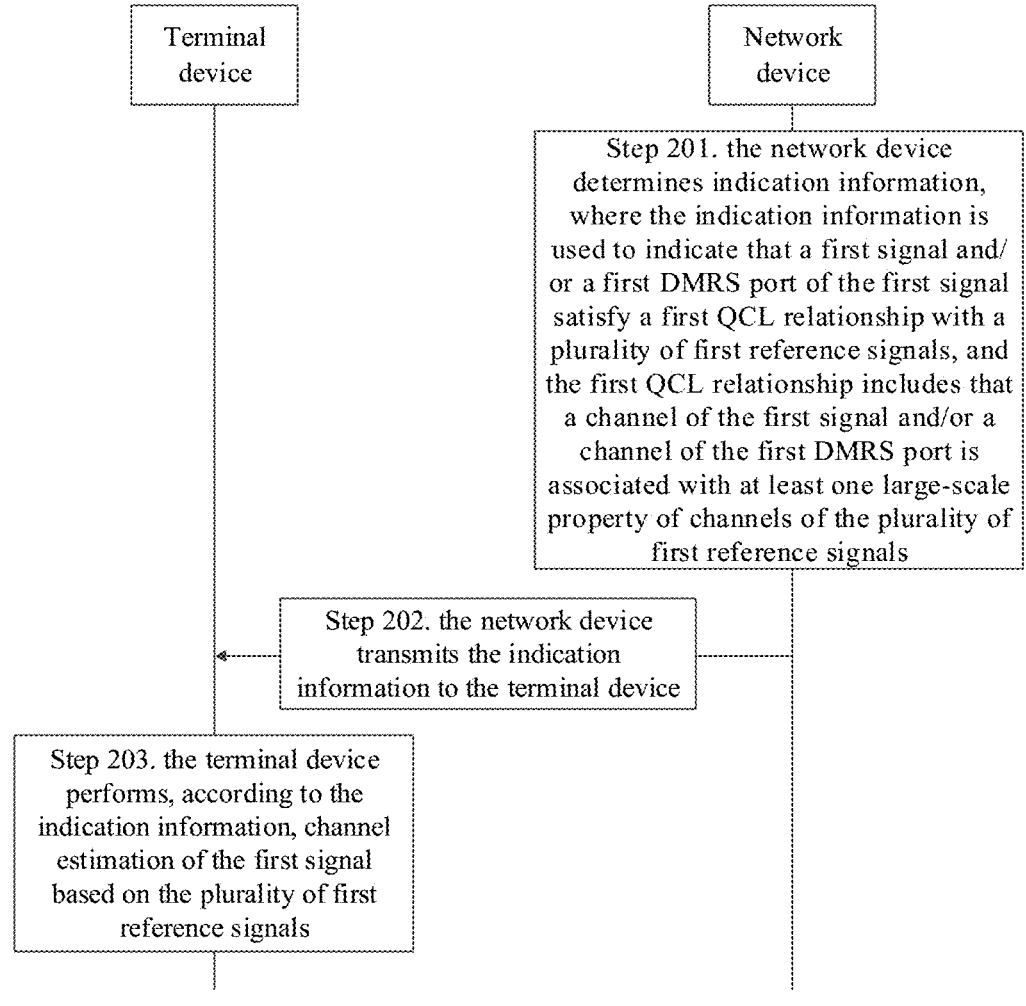

| Terminal device | | Network device |
|---|---|---|

Step 201. the network device determines indication information, where the indication information is used to indicate that a first signal and/ or a first DMRS port of the first signal satisfy a first QCL relationship with a plurality of first reference signals, and the first QCL relationship includes that a channel of the first signal and/or a channel of the first DMRS port is associated with at least one large-scale property of channels of the plurality of first reference signals Step 202. the network device transmits the indication information to the terminal device Step 203. the terminal device performs, according to the indication information, channel estimation of the first signal based on the plurality of first reference signals

CHANNEL ESTIMATION METHOD, APPARATUS, AND STORAGE MEDIUM

CROSS-REFERENCE TO RELATED APPLICATION

This application is a National Stage of International Application No. PCT/CN2021/126209, filed on Oct. 25, 2021, which claims priority to Chinese Patent Application No. 202011149123.3, which was filed with China National Intellectual Property Administration on Oct. 23, 2020 and titled "CHANNEL ESTIMATION METHOD, APPARATUS, AND STORAGE MEDIUM". The contents of the above two patent applications are incorporated herein by reference in their entireties.

FIELD

The present application relates to the field of communication technology and, in particular, to a channel estimation method, apparatus and a storage medium.

BACKGROUND

In the third generation partnership project (3GPP), the fourth generation (4G) communication system as well as subsequent evolution systems, it is necessary to support a typical high speed moving application scenario, such as a high speed transmission (HST) scenario.

In the HST scenario, remote radio heads (RRH) are connected to the same building baseband unit (BBU) via optical fibers, and the plurality of RRHs can simultaneously transmit first signals to a high-speed moving terminal device. In the prior art, Doppler parameter of a channel over which a first signal is transmitted can be determined by a quasi co-location (QCL) reference signal transmitted by RRHs, and a channel estimation interpolation coefficient can be determined according to Doppler property, to estimating the channel.

However, since the terminal device is moving at a high speed, signals received by the terminal device may come from opposite directions in case the RRHs are differently positioned, and the terminal device would obtain different Doppler parameters. Therefore, Doppler parameter determined in the above-described way is biased, and a channel estimation result is inaccurate, to affect the demodulation performance of the first signal.

SUMMARY

The present application provides a channel estimation method, apparatus and a storage medium, which enable a result of channel estimation by a terminal device to be relatively accurate, and the performance of signal demodulation can be improved.

In one embodiment of the present application provides a channel estimation method, including:

receiving indication information transmitted by a network device, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and performing, according to the indication information, channel estimation of the first signal based on the plurality of first reference signals.

In the present scheme, it is possible, in the present application, to perform channel estimation on a channel of a first signal through first reference signals; in case the channel is estimated through the plurality of first reference signals, a result of the channel estimation will be relatively accurate even if the terminal device is in a high-speed moving scenario, therefore, the performance of signal demodulation can be improved.

In one embodiment, the performing the channel estimation of the first signal based on the plurality of first reference signals includes:

acquiring at least one large-scale property of the channel of the first signal and/or a first DMRS port of the first signal according to the channels of the plurality of first reference signals, and/or, acquiring at least one channel estimation parameter according to the channels of the plurality of first reference signals; and performing the channel estimation of the first signal according to the at least one large-scale property and/or the at least one channel estimation parameter.

In the present scheme, the at least one large-scale property of the channel of the first signal is acquired jointly through the channels of the plurality of first reference signals, thus the accuracy of the at least one large-scale property can be improved. In addition, the at least one channel estimation parameter is acquired jointly through the channels of the plurality of first reference signals, thus the accuracy of the at least one channel estimation parameter can be improved.

In one embodiment, the first signal is a signal on an antenna port or a layer, and/or, the first reference signal is a signal on an antenna port.

In the present scheme, in case a channel of a first signal on a same antenna port or a same layer is estimated through first reference signals or a channel of a first signal is estimated through first reference signals on a same antenna port, the accuracy of the channel estimation can be improved.

In one embodiment, the channel of the first signal and/or the first DMRS port of the first signal is a channel on a same time-frequency resource block.

In the present scheme, by performing the channel estimation on the channel of the first signal located in the same time-frequency resource block, the accuracy of the channel estimation can be improved.

In one embodiment, the channel of the first signal is an equivalent channel corresponding to the channels of the plurality of first reference signals; or the channel of the first DMRS port of the first signal is an equivalent channel corresponding to the channels of the plurality of first reference signals.

In one embodiment, transmission antennas of the plurality of first reference signals are different, and the first signal is transmitted simultaneously on the transmission antennas respectively corresponding to the plurality of first reference signals.

In one embodiment, the acquiring the at least one large-scale property of the channel of the first signal and/or a first DMRS port of the first signal according to the channels of the plurality of first reference signals includes:

obtaining an equivalent channel according to the channels of the plurality of first reference signals, and determining the at least one large-scale property of the channel of the first signal and/or the first DMRS port of the first signal according to the equivalent channel; or determining at least one large-scale property correspond-
ing to a channel of each first reference signal according
to the channels of the plurality of first reference signals,
and determining the at least one large-scale property of
the channel of the first signal and/or the first DMRS
port of the first signal according to the at least one
large-scale property corresponding to the channel of
each first reference signal.

In the present scheme, when determining at least one
large-scale property, the terminal device may process the
channels of the plurality of first reference signals to obtain
an equivalent channel, and the at least one large-scale
property of the channel of the first signal and/or the first
DMRS port of the first signal can be determined according
to the equivalent channel. In this way, the result of the at
least one large-scale property can be more accurate.

In addition, when determining the at least one large-scale
property, the terminal device may also first determine at least
one large-scale property corresponding to the channel of
each first reference signal, and then perform joint processing
on the at least one large-scale property corresponding to the
channel of each first reference signal to determine the at least
one large-scale property of the channel of the first signal
and/or the first DMRS port of the first signal. In this way, the
accuracy of the at least one large-scale property of the
channel of the first signal can be improved.

In one embodiment, the acquiring the at least one channel
estimation parameter according to the channels of the plu-
rality of first reference signals includes:

obtaining an equivalent channel according to the channels
of the plurality of first reference signals, and determin-
ing at least one channel estimation parameter of the
channel of the first signal and/or the first DMRS port of
the first signal according to the equivalent channel; or determining at least one channel estimation parameter
corresponding to a channel of each first reference signal
according to the channels of the plurality of first
reference signals, and determining the at least one
channel estimation parameter of the channel of the first
signal and/or the first DMRS port of the first signal
according to the at least one channel estimation param-
eter corresponding to the channel of each first reference
signal.

In the present scheme, when determining at least one
channel estimation parameter, the terminal device may add
the channels of the plurality of first reference signals to
obtain an equivalent channel, and the at least one channel
estimation parameter of the channel of the first signal and/or
the first DMRS port of the first signal can be determined
according to the equivalent channel. In this way, the result
of the at least one channel estimation parameter can be more
accurate.

In addition, when determining the at least one channel
estimation parameter, the terminal device may also first
determine at least one channel estimation parameter corre-
sponding to the channel of each first reference signal, and
then perform joint processing on the at least one channel
estimation parameter corresponding to the channel of each
first reference signal to determine the at least one channel
estimation parameter of the channel of the first signal and/or
the first DMRS port of the first signal. In this way, the
accuracy of the at least one channel estimation parameter of
the channel of the first signal can be improved.

In one embodiment, the indication information includes
identification of the plurality of first reference signals and a
parameter used to indicate the at least one large-scale
property.

In one embodiment, an indication manner of the indica-
tion information includes:

indicating, respectively for each first reference signal of
the plurality of first reference signals, a parameter used
to indicate a corresponding large-scale property of the
first reference signal; or indicating at least one parameter used to indicate a
large-scale property, and indicating, respectively for
each parameter used to indicate the large-scale prop-
erty, a first reference signal corresponding to the param-
eter.

In one embodiment, the parameter used to indicate the
large-scale property is a QCL type, the indication informa-
tion includes at least two QCL types, and the at least two
QCL types include at least one of the following:

a first QCL type and a second QCL type;

a first QCL type, a second QCL type and a third QCL type;

a second QCL type and a fourth QCL type; and a second QCL type, a third QCL type and a fourth QCL
type;

where the first QCL type includes Doppler shift, Doppler
spread, average delay and delay spread;

the second QCL type includes Doppler shift and Doppler
spread;

the third QCL type includes spatial receive parameter; and the fourth QCL type includes average delay and delay
spread.

In the present scheme, in case the indication information
includes two QCL types, there might be an overlap for QCL
parameters corresponding to the QCL types, and thus the
flexibility of configuration of the QCL types can be
improved.

In one embodiment, the at least one large-scale property
includes Doppler property; the method further includes:

determining a reference property of the channel of the first
signal according to a second reference signal; where the
second reference signal is part of or all of the plurality
of first reference signals, or, the second reference signal
is a reference signal different from the plurality of first
reference signals; the reference property is different
from the Doppler property.

In one embodiment, the reference property includes delay
property.

In the present scheme, the terminal device may also
determine the reference property of the channel of the first
signal according to the second reference signal, and the
channel of the first signal can be performed with channel
estimation according to the Doppler property and the refer-
ence property, and the accuracy of the channel estimation
can be improved.

In one embodiment, the at least one large-scale property
includes Doppler property;

the method further includes:

determining Doppler property of the channel of the first
signal according to at least one first reference signal for
which a corresponding QCL type is a first QCL type
and at least one first reference signal for which a
corresponding QCL type is a second QCL type; or determining the Doppler property of the channel of the
first signal according to first reference signals for which
a QCL type is the second QCL type; or determining the Doppler property of the channel of the
first signal according to first reference signals for which
a QCL type is the first QCL type;

where the QCL type is a parameter used to indicate a
large-scale property, a large-scale property indicated by
the first QCL type includes Doppler shift, Doppler spread, average delay and delay spread, and a large-scale property indicated by the second QCL type includes Doppler shift and Doppler spread.

In the present scheme, the terminal device can simply and efficiently determine the Doppler property of the channel of the first signal according to the first reference signals configured in the first QCL type and/or the first reference signals configured in the second QCL type.

In one embodiment, the determining the reference property of the channel of the first signal according to the second reference signal includes:

determining the reference property of the channel of the first signal according to second reference signals for which a QCL type is a first QCL type; or determining the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In the present scheme, the terminal device can simply and efficiently determine the reference property of the channel of the first signal according to the second reference signals configured in the first QCL type or the first reference signals configured in the fourth QCL type.

In one embodiment, the indication information includes at least one piece of transmission configuration indicator TCI state information, and the indication information includes identification information of the plurality of first reference signals, and the identification information of the plurality of first reference signals is contained in a same piece of TCI state information; or the indication information includes plural pieces of TCI state information, and the indication information includes identification information of the plurality of first reference signals, the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In the present scheme, the identification information of the first reference signals may be configured in a TCI state information in different manners, and the flexibility of configuration of the identification information of the first reference signals can be improved.

In one embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In one embodiment, the first signal is transmitted simultaneously from transmission/reception points TRPs, and the plurality of first reference signals are transmitted to different TRPs of the plurality of TRPs, respectively.

In the present scheme, the terminal device can obtain a large-scale property or a channel estimation parameter corresponding to paths of individual TRPs by performing channel estimation on first reference signals, and a more accurate large-scale property or channel estimation parameter of the first signal can be obtained.

In one embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

In one embodiment of the present application provides a channel estimation method, including:

determining indication information, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and transmitting the indication information to a terminal device, where the indication information is used to indicate the terminal device to perform channel estimation of the first signal based on the plurality of first reference signals.

In the present scheme, after determining indication information, a network device in the present application transmits the indication information to a terminal device; the terminal device can perform channel estimation on a channel of a first signal through first reference signals; in case the channel is estimated through the plurality of first reference signals, a result of the channel estimation will be relatively accurate even if the terminal device is in a high-speed moving scenario, therefore, the performance of signal demodulation can be improved.

In one embodiment, the first signal is a signal on an antenna port or a layer, and/or, the first reference signal is a signal on an antenna port.

In the present scheme, in case a channel of a first signal on a same antenna port or a same layer is estimated through first reference signals or a channel of a first signal is estimated through first reference signals on a same antenna port, the accuracy of the channel estimation can be improved.

In one embodiment, the channel of the first signal and/or the first DMRS port of the first signal is a channel on a same time-frequency resource block.

In the present scheme, by performing the channel estimation on the channel of the first signal located in the same time-frequency resource block, the accuracy of the channel estimation can be improved.

In one embodiment, the indication information is used to indicate that at least one large-scale property of a channel of a first signal is the same as at least one large-scale property of a joint channel composed of channels of first reference signals, and the channel of the first signal is an equivalent channel corresponding to the channels of the plurality of first reference signals;

the indication information is used to indicate that at least one large-scale property of a channel of a first demodulation reference signal DMRS port of the first signal is the same as at least one large-scale property of a joint channel composed of channels of first reference signals, and the channel of the first DMRS port of the first signal is an equivalent channel corresponding to the channels of the plurality of first reference signals.

In one embodiment, transmission antennas of the plurality of first reference signals are different, and the first signal is transmitted simultaneously on the transmission antennas respectively corresponding to the plurality of first reference signals.

In one embodiment, the channel of the first signal and/or the first DMRS port of the first signal is equal to a sum of channels of the plurality of first reference signals.

In one embodiment, the indication information includes identification of the plurality of first reference signals and a parameter used to indicate the at least one large-scale property.

In one embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In one embodiment, the parameter used to indicate the large-scale property is a QCL type, the indication information includes at least two QCL types, and the at least two QCL types include at least one of the following:

a first QCL type and a second QCL type;
a first QCL type, a second QCL type and a third QCL type;
a second QCL type and a fourth QCL type; and
a second QCL type, a third QCL type and a fourth QCL type;
where the first QCL type includes Doppler shift, Doppler spread, average delay and delay spread;
the second QCL type includes Doppler shift and Doppler spread;
the third QCL type includes spatial receive parameter; and
the fourth QCL type includes average delay and delay spread.

In the present scheme, in case the indication information includes two QCL types, there might be an overlap for QCL parameters corresponding to the QCL types, and thus the flexibility of configuration of the QCL types can be improved.

In one embodiment, the at least one large-scale property includes Doppler property; the indication information is further used to indicate that the first signal or the first DMRS port is associated with a second reference signal in respect of a reference property of a channel, where the second reference signal is part of or all of the plurality of first reference signals, or, the second reference signal is a reference signal different from the plurality of first reference signals; the reference property is different from the Doppler property.

In one embodiment, the reference property includes delay property.

In the present scheme, the terminal device may also determine the reference property of the channel of the first signal according to the second reference signal, and the channel of the first signal can be performed with channel estimation according to the Doppler property and the reference property, and the accuracy of the channel estimation can be improved.

In one embodiment, the at least one large-scale property includes Doppler property; the indication information is further used to indicate the terminal device to determine Doppler property of the channel of the first signal according to at least one first reference signal for which a corresponding QCL type is a first QCL type and at least one first reference signal for which a corresponding QCL type is a second QCL type; or is further used to indicate the terminal device to determine the Doppler property of the channel of the first signal according to first reference signals for which a QCL type is the second QCL type; or is further used to indicate the terminal device to determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In the present scheme, the terminal device can simply and efficiently determine the Doppler property of the channel of the first signal according to the first reference signals configured in the first QCL type and/or the first reference signals configured in the second QCL type.

In one embodiment, the indication information is further used to indicate the terminal device to determine the reference property of the channel of the first signal according to second reference signals for which a QCL type is a first QCL type; or is further used to indicate the terminal device to determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In the present scheme, the terminal device can simply and efficiently determine the reference property of the channel of the first signal according to the second reference signals configured in the first QCL type or the first reference signals configured in the fourth QCL type.

In one embodiment, the indication information includes at least one piece of transmission configuration indicator TCI state information, and the indication information includes identification information of the plurality of first reference signals, then the identification information of the plurality of first reference signals is contained in the at least one piece of TCI state information; or the indication information includes plural pieces of TCI state information, and the indication information includes identification information of the plurality of first reference signals, then the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In the present scheme, the identification information of the first reference signals may be configured in a TCI state information in different manners, and the flexibility of configuration of the identification information of the first reference signals can be improved.

In one embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In one embodiment, the first signal is transmitted simultaneously from transmission/reception points TRPs, and the plurality of first reference signals are transmitted to different TRPs of the plurality of TRPs, respectively.

In the present scheme, the terminal device can obtain a large-scale property or a channel estimation parameter corresponding to paths of individual TRPs by performing channel estimation on first reference signals, and a more accurate large-scale property or channel estimation parameter of the first signal can be obtained.

In one embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

In one embodiment of the present application provides a terminal device, including: a memory, a transceiver and a processor, where the memory is configured to store a computer program; the transceiver is configured to transmit and receive data under control of the processor; the processor is configured to read the computer program in the memory and execute operations of:

receiving indication information transmitted by a network device, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and performing, according to the indication information, channel estimation of the first signal based on the plurality of first reference signals.

In one embodiment, the processor is configured to:

acquire at least one large-scale property of the channel of the first signal and/or a first DMRS port of the first signal according to the channels of the plurality of first reference signals, and/or, acquire at least one channel estimation parameter according to the channels of the plurality of first reference signals; and perform the channel estimation of the first signal according to the at least one large-scale property and/or the at least one channel estimation parameter.

In one embodiment, the first signal is a signal on an antenna port or a layer, and/or, the first reference signal is a signal on an antenna port.

In one embodiment, the channel of the first signal and/or the first DMRS port of the first signal is a channel on a same time-frequency resource block.

In one embodiment, the channel of the first signal is an equivalent channel corresponding to the channels of the plurality of first reference signals; or the channel of the first DMRS port of the first signal is an equivalent channel corresponding to the channels of the plurality of first reference signals.

In one embodiment, transmission antennas of the plurality of first reference signals are different, and the first signal is transmitted simultaneously on the transmission antennas respectively corresponding to the plurality of first reference signals.

In one embodiment, the processor is configured to:

obtain an equivalent channel according to the channels of the plurality of first reference signals, and determine the at least one large-scale property of the channel of the first signal and/or the first DMRS port of the first signal according to the equivalent channel; or determine at least one large-scale property corresponding to a channel of each first reference signal according to the channels of the plurality of first reference signals, and determine the at least one large-scale property of the channel of the first signal and/or the first DMRS port of the first signal according to the at least one large-scale property corresponding to the channel of each first reference signal.

In one embodiment, the processor is configured to:

obtain an equivalent channel according to the channels of the plurality of first reference signals, and determine at least one channel estimation parameter of the channel of the first signal and/or the first DMRS port of the first signal according to the equivalent channel; or determine at least one channel estimation parameter corresponding to a channel of each first reference signal according to the channels of the plurality of first reference signals, and determine the at least one channel estimation parameter of the channel of the first signal and/or the first DMRS port of the first signal according to the at least one channel estimation parameter corresponding to the channel of each first reference signal.

In one embodiment, the indication information includes identification of the plurality of first reference signals and a parameter used to indicate the at least one large-scale property.

In one embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In one embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In one embodiment, the at least one large-scale property includes Doppler property; the processor is configured to:

determine a reference property of the channel of the first signal according to a second reference signal; where the second reference signal is part of or all of the plurality of first reference signals, or, the second reference signal is a reference signal different from the plurality of first reference signals; the reference property is different from the Doppler property.

In one embodiment, the reference property includes delay property.

In one embodiment, the at least one large-scale property includes Doppler property;

the processor is configured to:

determine Doppler property of the channel of the first signal according to at least one first reference signal for which a corresponding QCL type is a first QCL type and at least one first reference signal for which a corresponding QCL type is a second QCL type; or determine the Doppler property of the channel of the first signal according to first reference signals for which a QCL type is the second QCL type; or determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In one embodiment, the processor is configured to:

determine the reference property of the channel of the first signal according to second reference signals for which a QCL type is a first QCL type; or determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In one embodiment, the indication information includes at least one piece of transmission configuration indicator TCI state information, and the indication information includes identification information of the plurality of first reference signals, and the identification information of the plurality of first reference signals is contained in a same piece of TCI state information; or the indication information includes plural pieces of TCI state information, and the indication information includes identification information of the plurality of first reference signals, the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In one embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In one embodiment, the first signal is transmitted simultaneously from transmission/reception points TRPs, and the plurality of first reference signals are transmitted to different TRPs of the plurality of TRPs, respectively.

In one embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

In one embodiment of the present application provides a network device, including: a memory, a transceiver and a processor, where the memory is configured to store a computer program; the transceiver is configured to transmit and receive data under control of the processor; the processor is configured to read the computer program in the memory and execute operations of:

determining indication information, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and transmitting the indication information to a terminal device, where the indication information is used to indicate the terminal device to perform channel estimation of the first signal based on the plurality of first reference signals.

In one embodiment, the first signal is a signal on an antenna port or a layer, and/or, the first reference signal is a signal on an antenna port.

In one embodiment, the channel of the first signal and/or the first DMRS port of the first signal is a channel on a same time-frequency resource block.

In one embodiment, the indication information is used to indicate that at least one large-scale property of a channel of a first signal is the same as at least one large-scale property of a joint channel composed of channels of first reference signals, and the channel of the first signal is an equivalent channel corresponding to the channels of the plurality of first reference signals;

the indication information is used to indicate that at least one large-scale property of a channel of a first demodulation reference signal DMRS port of the first signal is the same as at least one large-scale property of a joint channel composed of channels of first reference signals, and the channel of the first DMRS port of the first signal is an equivalent channel corresponding to the channels of the plurality of first reference signals.

In one embodiment, transmission antennas of the plurality of first reference signals are different, and the first signal is transmitted simultaneously on the transmission antennas respectively corresponding to the plurality of first reference signals.

In one embodiment, the channel of the first signal and/or the first DMRS port of the first signal is equal to a sum of channels of the plurality of first reference signals.

In one embodiment, the indication information includes identification of the plurality of first reference signals and a parameter used to indicate the at least one large-scale property.

In one embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In one embodiment, the parameter used to indicate the large-scale property is a QCL type, the indication information includes at least two QCL types, and the at least two QCL types include at least one of the following:

a first QCL type and a second QCL type;
a first QCL type, a second QCL type and a third QCL type;
a second QCL type and a fourth QCL type; and
a second QCL type, a third QCL type and a fourth QCL type;
where the first QCL type includes Doppler shift, Doppler spread, average delay and delay spread;
the second QCL type includes Doppler shift and Doppler spread;
the third QCL type includes spatial receive parameter; and
the fourth QCL type includes average delay and delay spread.

In one embodiment, the at least one large-scale property includes Doppler property; the indication information is further used to indicate that the first signal or the first DMRS port is associated with a second reference signal in respect of a reference property of a channel, where the second reference signal is part of or all of the plurality of first reference signals, or, the second reference signal is a reference signal different from the plurality of first reference signals; the reference property is different from the Doppler property.

In one embodiment, the reference property includes delay property.

In one embodiment, the at least one large-scale property includes Doppler property; the indication information is further used to indicate the terminal device to determine Doppler property of the channel of the first signal according to at least one first reference signal for which a corresponding QCL type is a first QCL type and at least one first reference signal for which a corresponding QCL type is a second QCL type; or is further used to indicate the terminal device to determine the Doppler property of the channel of the first signal according to first reference signals for which a QCL type is the second QCL type; or is further used to indicate the terminal device to determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In one embodiment, the indication information is further used to indicate the terminal device to determine the reference property of the channel of the first signal according to second reference signals for which a QCL type is a first QCL type; or is further used to indicate the terminal device to determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In one embodiment, the indication information includes at least one piece of transmission configuration indicator TCI state information, and the indication information includes identification information of the plurality of first reference signals, then the identification information of the plurality of first reference signals is contained in the at least one piece of TCI state information; or the indication information includes plural pieces of TCI state information, and the indication information includes identification information of the plurality of first reference signals, then the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In one embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In one embodiment, the first signal is transmitted simultaneously from transmission/reception points TRPs, and the plurality of first reference signals are transmitted to different TRPs of the plurality of TRPs, respectively.

In one embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

In one embodiment of the present application provides a channel estimation apparatus, including:

a receiving unit, configured to receive indication information transmitted by a network device, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and a processing unit, configured to perform, according to the indication information, channel estimation of the first signal based on the plurality of first reference signals.

In one embodiment, the processing unit is configured to:

acquire at least one large-scale property of the channel of the first signal and/or a first DMRS port of the first signal according to channels of the plurality of first reference signals, and/or, acquire at least one channel estimation parameter according to the channels of the plurality of first reference signals; and perform the channel estimation of the first signal according to the at least one large-scale property and/or the at least one channel estimation parameter.

In one embodiment, the first signal is a signal on an antenna port or a layer, and/or, the first reference signal is a signal on an antenna port.

In one embodiment, the channel of the first signal and/or the first DMRS port of the first signal is a channel on a same time-frequency resource block.

In one embodiment, the channel of the first signal is an equivalent channel corresponding to the channels of the plurality of first reference signals; or the channel of the first DMRS port of the first signal is an equivalent channel corresponding to the channels of the plurality of first reference signals.

In one embodiment, transmission antennas of the plurality of first reference signals are different, and the first signal is transmitted simultaneously on the transmission antennas respectively corresponding to the plurality of first reference signals.

In one embodiment, the processing unit is configured to:

obtain an equivalent channel according to the channels of the plurality of first reference signals, and determine the at least one large-scale property of the channel of the first signal and/or the first DMRS port of the first signal according to the equivalent channel; or determine at least one large-scale property corresponding to a channel of each first reference signal according to the channels of the plurality of first reference signals, and determine the at least one large-scale property of the channel of the first signal and/or the first DMRS port of the first signal according to the at least one large-scale property corresponding to the channel of each first reference signal.

In one embodiment, the processing unit is configured to:

obtain an equivalent channel according to the channels of the plurality of first reference signals, and determine at least one channel estimation parameter of the channel of the first signal and/or the first DMRS port of the first signal according to the equivalent channel; or determine at least one channel estimation parameter corresponding to a channel of each first reference signal according to the channels of the plurality of first reference signals, and determine the at least one channel estimation parameter of the channel of the first signal and/or the first DMRS port of the first signal according to the at least one channel estimation parameter corresponding to the channel of each first reference signal.

In one embodiment, the indication information includes identification of the plurality of first reference signals and a parameter used to indicate the at least one large-scale property.

In one embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In one embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In one embodiment, the at least one large-scale property includes Doppler property;

the processing unit is configured to:

determine a reference property of the channel of the first signal according to a second reference signal; where the second reference signal is part of or all of the plurality of first reference signals, or, the second reference signal is a reference signal different from the plurality of first reference signals; the reference property is different from the Doppler property.

In one embodiment, the reference property includes delay property.

In one embodiment, the at least one large-scale property includes Doppler property;

the processing unit is configured to:

determine Doppler property of the channel of the first signal according to at least one first reference signal for which a corresponding QCL type is a first QCL type and at least one first reference signal for which a corresponding QCL type is a second QCL type; or determine the Doppler property of the channel of the first signal according to first reference signals for which a QCL type is the second QCL type; or determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In one embodiment, the processing unit is configured to:

determine the reference property of the channel of the first signal according to second reference signals for which a QCL type is a first QCL type; or determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In one embodiment, the indication information includes at least one piece of transmission configuration indicator TCI state information, and the indication information includes identification information of the plurality of first reference signals, and the identification information of the plurality of first reference signals is contained in a same piece of TCI state information; or the indication information includes plural pieces of TCI state information, and the indication information includes identification information of the plurality of first reference signals, the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In one embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In one embodiment, the first signal is transmitted simultaneously from transmission/reception points TRPs, and the plurality of first reference signals are transmitted to different TRPs of the plurality of TRPs, respectively.

In one embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

In one embodiment of the present application provides a channel estimation apparatus, including:

a processing unit, configured to determine indication information, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and a transmitting unit, configured to transmit the indication information to a terminal device, where the indication information is used to indicate the terminal device to perform channel estimation of the first signal based on the plurality of first reference signals.

In one embodiment, the first signal is a signal on an antenna port or a layer, and/or, the first reference signal is a signal on an antenna port.

In one embodiment, the channel of the first signal and/or the first DMRS port of the first signal is a channel on a same time-frequency resource block.

In one embodiment, the indication information is used to indicate that at least one large-scale property of a channel of a first signal is the same as at least one large-scale property of a joint channel composed of channels of first reference signals, and the channel of the first signal is an equivalent channel corresponding to the channels of the plurality of first reference signals;

the indication information is used to indicate that at least one large-scale property of a channel of a first demodulation reference signal DMRS port of the first signal is the same as at least one large-scale property of a joint channel composed of channels of first reference signals, and the channel of the first DMRS port of the first signal is an equivalent channel corresponding to the channels of the plurality of first reference signals.

In one embodiment, transmission antennas of the plurality of first reference signals are different, and the first signal is transmitted simultaneously on the transmission antennas respectively corresponding to the plurality of first reference signals.

In one embodiment, the channel of the first signal and/or the first DMRS port of the first signal is equal to a sum of channels of the plurality of first reference signals.

In one embodiment, the indication information includes identification of the plurality of first reference signals and a parameter used to indicate the at least one large-scale property.

In one embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In one embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In one embodiment, the at least one large-scale property includes Doppler property; the indication information is further used to indicate that the first signal or the first DMRS port is associated with a second reference signal in respect of a reference property of a channel, where the second reference signal is part of or all of the plurality of first reference signals, or, the second reference signal is a reference signal different from the plurality of first reference signals; the reference property is different from the Doppler property.

In one embodiment, the reference property includes delay property.

In one embodiment, the at least one large-scale property includes Doppler property; the indication information is further used to indicate the terminal device to determine Doppler property of the channel of the first signal according to at least one first reference signal for which a corresponding QCL type is a first QCL type and at least one first reference signal for which a corresponding QCL type is a second QCL type; or is further used to indicate the terminal device to determine the Doppler property of the channel of the first signal according to first reference signals for which a QCL type is the second QCL type; or is further used to indicate the terminal device to determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In one embodiment, the indication information is further used to indicate the terminal device to determine the reference property of the channel of the first signal according to second reference signals for which a QCL type is a first QCL type; or is further used to indicate the terminal device to determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In one embodiment, the indication information includes at least one piece of transmission configuration indicator TCI state information, and the indication information includes identification information of the plurality of first reference signals, then the identification information of the plurality of first reference signals is contained in the at least one piece of TCI state information; or the indication information includes plural pieces of TCI state information, and the indication information includes identification information of the plurality of first reference signals, then the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In one embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In one embodiment, the first signal is transmitted simultaneously from transmission/reception points TRPs, and the plurality of first reference signals are transmitted to different TRPs of the plurality of TRPs, respectively.

In one embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

In one embodiment of the present application provides a computer-readable storage medium. The computer-readable storage medium has, stored therein, a computer program enabling a processor to perform the channel estimation method described in any one of the foregoing implementations.

The present application provides a channel estimation method and apparatus and a storage medium. A network device transmits indication information to a terminal device, where the indication information is used to indicate that a first signal and/or a first DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; the terminal device performs channel estimation of the first signal according to the indication information based on the plurality of first reference signals, where the first signal is different from the first reference signals. Compared with the prior art, it is possible, in the present application, to perform channel estimation on a channel of a first signal through first reference signals; in case the channel is estimated through the plurality of first reference signals, a result of the channel estimation will be relatively accurate even if the terminal device is in a high-speed moving scenario, therefore, the performance of signal demodulation can be improved.

It will be appreciated that the content described in the summary section is not intended to limit key or important features of the embodiments of the present disclosure, nor to limit the scope of the present disclosure. Other features of the present disclosure will become readily comprehensible from the following description.

BRIEF DESCRIPTION OF DRAWINGS

In order to describe the embodiments of the present application or the prior art more clearly, the accompanying drawings used in the description of the embodiments or the prior art are briefly described hereunder. Apparently, the drawings in the following description are intended for some embodiments of the present disclosure.

FIG. 1 is a schematic diagram illustrating a scenario in which a channel estimation method according to an embodiment of the present application is applied.

FIG. 2 is a signaling flow diagram illustrating a channel estimation method according to an embodiment of the present application.

DESCRIPTION OF EMBODIMENTS

Figure 3:
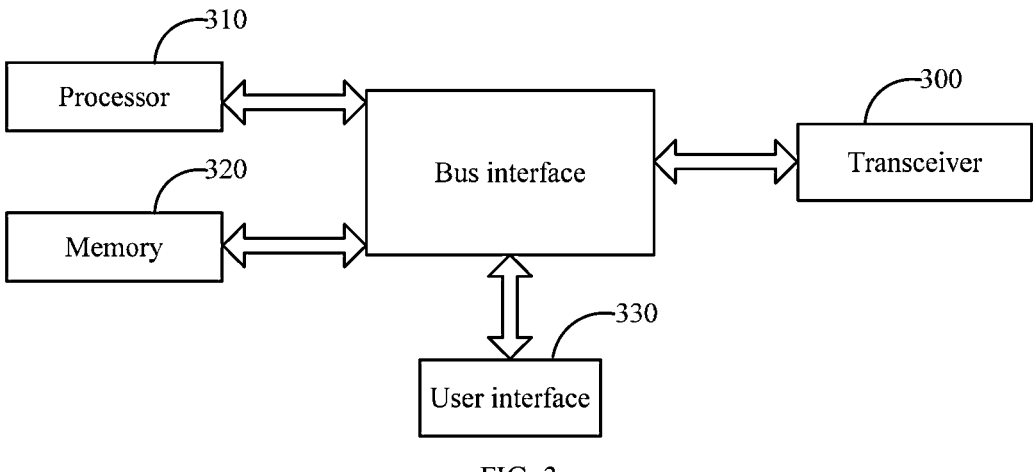
FIG. 3 is a schematic diagram illustrating a terminal device according to an embodiment of the present application.

The term "and/or" in the present application is intended to describe an association between associated objects, which indicates that there may be three relationships, for example, A and/or B may indicate presence of A only, of both A and B, and of B only. The character "/" generally indicates that contextual objects have an "or" relationship.

The term with regard to plural reference in the embodiments of the present application refers to two or more, and there is a similar case for other quantifiers.

The embodiments of the present application will be described hereunder clearly and comprehensively with reference to the accompanying drawings in the embodiments of the present application. Apparently, the described embodiments are only a part of the embodiments of the present application, rather than all of the embodiments of the present application.

The embodiments of the present application provide a channel estimation method, apparatus, which are used in a case of channel estimation and, in case a network device indicates that at least one large-scale property of a channel of a first signal and/or a DMRS port of the first signal is the same as at least one large-scale property of a joint channel composed of channels of first reference signals, a terminal device can perform channel estimation of the first signal based on the above-described plurality of first reference signals. Compared with the prior art, it is possible, in the present application, to perform channel estimation on a channel of a first signal through first reference signals; in case the channel is estimated through the plurality of first reference signals, a result of the channel estimation will be relatively accurate even if the terminal device is in a high-speed moving scenario, therefore, the performance of signal demodulation can be improved.

Among them, the method and the apparatus are conceived based on the same application. Since the problem is solved using similar principles in terms of the method and the apparatus, mutual reference can be made to implementations of the method and the apparatus, and detailed description will not be described for the sake of redundancy.

The embodiments of the present application are applicable to various systems, especially fifth generation (5G) communication systems. For example, the suitable system may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system UMTS), a worldwide interoperability for microwave access (WiMAX) system, a 5G new radio (NR) system, or the like. Each of these systems includes a terminal device and a network device. The system may also include a core network part, such as an evolved packet system (EPS), a 5G system (5GS), or the like.

The terminal device involved in the embodiments of the present application may refer to a device providing voice and/or data connectivity to users, a handheld device with a wireless connection function, or other processing device connected to a wireless modem, or the like. In different systems, the terminal device may have different names, for example, in the 5G system, the terminal device may be termed as user equipment (UE). A wireless terminal device may communicate with one or more core networks (CN) via a radio access network (RAN), and the wireless terminal device may be a mobile terminal device, such as a mobile phone (or termed as a "cellular" phone) and a computer having the mobile terminal device, for example, it may be a portable, pocket-sized, handheld, computer-built-in or vehicle-mounted mobile device, which exchanges voice and/or data with the radio access network, e.g., devices such as a personal communication service (PCS) phone, a cordless phone, a session initiated protocol (SIP) phone, a wireless local loop (WLL) station, a personal digital assistant (PDA). The wireless terminal device can also be termed as a system, a subscriber unit, a subscriber station, a mobile station, a mobile, a remote station, an access point, a remote terminal, an access terminal, a user terminal, a user agent, a user device or the like, which is not limited in the embodiments of the present application.

The network device involved in the embodiments of the present application may be a base station, and the base station may include cells serving the terminal. Depending on a specific application scenario, the base station may also be termed as an access point, or it may be a device in the access network that communicates with the wireless terminal device on an air interface through one or more sectors, or it may be named otherwise. The network device can be configured to replace a received air frame with an internet protocol (IP) packet, acting as a router between the wireless terminal device and the remainder of the access network, where the remainder of the access network may include an Internet Protocol (IP) communication network. The network device can also coordinate property management on air interfaces. For example, the network device involved in the embodiments of the present application may be a network device (BTS) in the global system of mobile communication (GSM system or the code division multiple access (CDMA) system, or a network device (NodeB) in the wide-band code division multiple access (WCDMA), or a evolutional network device (evolutional Node B, eNB or e-NodeB) in the long term evolution (LTE) system, or a 5G base station (gNB) in a 5G network architecture (next generation system), or a home evolved base station (Home evolved Node B, HeNB), or a relay node, or a femto base station (femto), or a pico base station (pico) or the like, which is not limited in the embodiments of the present application. In some network structures, the network device may include a centralized unit (CU) node and a distributed unit (DU) node, and the centralized unit and the distributed unit can also be arranged geographically separately.

The network device and the terminal device can each use one or more antennas for Multi Input Multi Output (MIMO) transmission, where the MIMO transmission can be Single User MIMO (SU-MIMO) or Multi User MIMO (MU-MIMO. Depending on the configuration and number of antenna combinations, the MIMO transmission may be two-dimension MIMO (2D-MIMO), three-dimension MIMO (3D-MIMO), full-dimensional MIMO (FD-MIMO) or massive-MIMO, or it may be diversity transmission or precoding transmission or beamforming transmission or the like.

Further, the RRH involved in the embodiments of the present application is a special component located on the top of the network device, which mainly performs the following functions: i) conversion of an optical signal into an electrical signal; ii) conversion of an electrical signal into an optical signal; iii) up/down frequency conversion; and iv) amplification of an RF signal. The RRH consists of a base station RF unit, a filter, an analog-to-digital converter, a digital-to-analog converter, and an up/down converter. The connection between the RRH and the remainder of the base station (BBU) is mainly implemented by a fiber link.

FIG. 1 is a schematic diagram illustrating a scenario in which a channel estimation method according to an embodiment of the present application is applied. As shown in FIG. 1, in a high-speed rail scenario, in order to avoid frequent cell switching of the terminal device, the deployment of a single frequency network (SFN) is generally adopted, that is, an HST-SFN scenario is used. As shown in FIG. 1, RRHs (each RRH can be deemed as a transmission point) RRH0, RRH1, RRH2 and RRH3 are connected to the same BBU via optical fibers, and these RRHs use the same cell identity (ID). Through the connection of these RRHs, the cell coverage is expanded, to reduce the cell switching frequency of the terminal device 10. These RRHs are generally connected to the BBU via optical fibers, and at this point, it can be regarded that there is an ideal backhaul among these RRHs. In the HST-SFN scenario, RRHs are connected to the same BBU, and each of which is generally deployed with two transmission/reception points (TRPs) directing towards different beam directions to cover the rails; in addition, all of the RRHs connected to the same BBU share the same cell ID.

In the prior art, the transmission scheme of the HST-SFN scenario is transparent SFN transmission, that is, a downlink shared channel (PDSCH) and a demodulation reference signal (dDMRS) are sent from RRHs and configured with a TCI state, and based on a reference signal for which a QCL type configured in the TCI state includes Doppler property, the terminal device estimates Doppler property of a channel experienced by the PDSCH, to perform channel estimation on the channel.

In the HST-SFN scenario, the PDSCH is generally sent from all the RRHs connected to one BBU at the same time, that is, all the RRHs transmit the same codeword, layer and DMRS port, and RRHs equivalently form more paths. At the position of the terminal device 10 as shown in FIG. 1, there will be a negative Doppler offset for the PDSCH reaching the terminal device from RRH0 and RRH1, and there will be a positive Doppler offset for the PDSCH reaching the terminal device from RRH2 and RRH3, that is, it is possible to have a large Doppler spread. Due to the rapid movement of trains, different RRHs may vary significantly in terms of Doppler shift, and the use of a QCL reference signal transmitted from all the RRHs to determine Doppler shift of the PDSCH might make the determined Doppler shift inaccurate, and a result of channel estimation is not accurate, thus affecting the demodulation performance of the PDSCH.

With considerations of the foregoing problem, proposed in an embodiment of the present application is a channel estimation method. In the method, a network device will transmit indication information to a terminal device, where the indication information is used to indicate that a first signal and/or a DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; the terminal device, after receiving the indication information, can perform channel estimation of the first signal based on the above-described plurality of first reference signals. Since the terminal device can perform the channel estimation of the first signal according to the plurality of first reference signals, the terminal device can perform the channel estimation of the first signal more accurately even in an HST-SFN scenario, and the demodulation performance of the first signal can be improved.

FIG. 2 is a signaling flow diagram illustrating a channel estimation method according to an embodiment of the present application. As shown in FIG. 2, the method includes the following steps.

At step 201, a network device determines indication information, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals.

In an embodiment, the first signal being associated with the plurality of first reference signals in respect of the at least one large-scale property of the channel means: the at least one large-scale property of the channel of the first signal being the same as at least one large-scale property of a joint channel composed of channels of the plurality of first reference signals. In one embodiment, one of the following items is possible:

at least one large-scale property of a combination of channels of the plurality of first reference signals is the same as the at least one large-scale property of the channel of the first signal;

the at least one large-scale property of the channel over which a symbol of the first signal is transmitted can be obtained through at least one large-scale property of a sum of channels over which symbols of the plurality of first reference signals are transmitted;

the at least one large-scale property of the channel over which a symbol of the first signal is transmitted is equal to at least one large-scale property corresponding to a combined channel of channels over which symbols of the plurality of first reference signal are transmitted; and the at least one large-scale property of the channel over which a symbol of the first signal is transmitted is equal to at least one large-scale property corresponding to a first combined channel, where the first combined channel is a sum of the following channels: a sum of channels for one symbol of one of all of the plurality of first signals.

In an embodiment, the quasi co-location (QCL) relationship in the present embodiment includes one or more of the following:

in case a large-scale property of an experienced channel over which a symbol on an antenna port is transmitted can be inferred from a channel over which a symbol on another antenna port is transmitted, it can be regarded that these two antenna ports are quasi co-located, where the large-scale property may include one or more of delay spread, average delay, Doppler spread, Doppler delay, and average gain, spatial transmit parameter, and spatial receive parameter;

in case a large-scale property of a channel over which a signal is transmitted can be inferred from a channel over which a symbol of another signal is transmitted, it can be regarded that these two signals are quasi co-located, where the large-scale property may include one or more of: delay spread, average delay, Doppler spread, Doppler delay, average gain, spatial transmit parameter, and spatial receive parameter;

in case a large-scale property of a channel of a signal can be inferred from a channel of a group of signals jointly, it can be regarded that the signal and the group of signals are quasi co-located, where the large-scale property may include one or more of: delay spread, average delay, Doppler spread, Doppler delay, average gain, spatial transmit parameter, and spatial receive parameter;

in case a large-scale property of a channel of a signal can be inferred jointly from a joint channel composed of channels of a group of signals, it can be regarded that the signal and the group of signals are quasi co-located, where the large-scale property may include one or more of: delay spread, average delay, Doppler spread, Doppler delay, average gain, spatial transmit parameter, and spatial receive parameter;

in case a large-scale property of a channel over which a symbol on an antenna port is transmitted can be inferred jointly from a channel over which symbols on a group of antenna ports are transmitted, it can be regarded that the antenna port and the group of antenna ports are quasi co-located, where the large-scale property may include one or more of: delay spread, average delay, Doppler spread, Doppler delay, average gain, spatial transmit parameter, and spatial receive parameter;

in case a large-scale property of a channel over which a symbol on an antenna port can be inferred jointly from a joint channel composed of channels over which symbols on a group of antenna ports are transmitted, it can be regarded that the antenna port and the group of antenna ports are quasi co-located, where the large-scale property may include one or more of: delay spread, average delay, Doppler spread, Doppler delay, average gain, spatial transmit parameter, and spatial receive parameter;

in case a large-scale property of a channel experienced by a signal can be inferred jointly from a channel experienced by a group of signals, it can be regarded that the signal and the group of signals are quasi co-located, where the large-scale property may include one or more of: delay spread, average delay, Doppler spread, Doppler delay, average gain, spatial transmit parameter, and spatial receive parameter;

in case a large-scale property of a channel experienced by a signal can be inferred jointly from a joint channel composed of channels experienced by a group of signals, it can be regarded that the signal and the group of signals are quasi co-located, where the large-scale property may include one or more of: delay spread, average delay, Doppler spread, Doppler delay, average gain, spatial transmit parameter, and spatial receive parameter.

In the present embodiment, the channel of the first signal can be interpreted as a channel experienced by the first signal, or a channel over which the first signal is transmitted, or the like.

In an embodiment, the first signal is a signal corresponding to an antenna port.

In an embodiment, the first reference signal is a signal corresponding to a reference signal antenna port.

In an embodiment, the first signal is a signal corresponding to a data layer.

In one embodiment, the indication information determined by the network device may also include identification information of the plurality of first reference signals. Exemplarily, the plurality of first reference signals may have a same signal type, or at least part of the plurality of first reference signals may have a different signal type. The first reference signals include at least one of the following signal types: a channel state information reference signal (CSI-RS) for channel state information (CSI) acquisition, a synchronization signal and physical broadcast channel block (SSB) and a tracking reference signal (TRS).

For example, if there are three first reference signals, these three first reference signals may all have a same signal type, e.g., the three first reference signals can all be CSI-RSs or SSBs, alternatively, part of the first reference signals has a different signal type, e.g., the three first reference signals are respectively a CSI-RS, an SSB and a TRS, or the first one of the first reference signals is a CSI-RS and the second one of the first reference signals and the third one of the first reference signals are TRSs, etc.

Further, the indication information is used to indicate that the first signal and/or the first demodulation reference signal DMRS port of the first signal satisfy the first quasi co-location QCL relationship with the plurality of first reference signals, and the first QCL relationship includes that a channel of the first signal and/or a channel of the first DMRS port is associated with at least one large-scale property of channels of the plurality of first reference signals.

The large-scale property may include at least one of Doppler property, delay property and spatial receive parameter, where Doppler property includes Doppler shift and/or Doppler spread, the delay property includes average delay and/or delay spread, the spatial receive parameter (Spatial Rx parameter) can be a spatial receive beam, for example. The channel estimation parameter can be an interpolation coefficient used for channel estimation.

At step 202, the network device transmits the indication information to a terminal device.

In this step, the network device can transmit the indication information to the terminal device after determining the indication information. Exemplarily, the above-described indication information can be transmitted to the terminal device via an RRH.

At step 203, the terminal device performs, according to the indication information, channel estimation of the first signal based on the plurality of first reference signals.

In this step, the indication information has indicated that the first signal and/or the first demodulation reference signal DMRS port of the first signal satisfy the first quasi co-location QCL relationship with the plurality of first reference signals, and the first QCL relationship includes that a channel of the first signal and/or a channel of the first DMRS port is associated with at least one large-scale property of channels of the plurality of first reference signals, therefore, the terminal device can perform, according to the indication information, channel estimation of the first signal based on the plurality of first reference signals.

Exemplarily, in case the terminal device performs channel estimation on the channel of the first signal and/or the first DMRS port of the first signal based on the plurality of first reference signals, it is possible to acquire at least one large-scale property of the channel of the first signal jointly according to the channels of the plurality of first reference signals, and/or, acquire at least one channel estimation parameter jointly according to the channels of the plurality of first reference signals, and then perform the channel estimation of the first signal according to the at least one large-scale property and/or the at least one channel estimation parameter.

In one embodiment, the terminal device may acquire at least one large-scale property of the channel of the first signal and/or a first DMRS port of the first signal only according to the channels of the plurality of first reference signals, and perform the channel estimation of the first signal according to the at least one large-scale property; the terminal device may also acquire at least one channel estimation parameter only according to the channels of the plurality of first reference signals, and perform the channel estimation of the first signal according to the at least one channel estimation parameter; the terminal device may also acquire at least one large-scale property of the channel of the first signal according to the channels of the plurality of first reference signals while acquiring at least one channel estimation parameter according to the channels of the plurality of first reference signals, and then perform the channel estimation of the first signal jointly according to the obtained at least one large-scale property and at least one channel estimation parameter.

The large-scale property may include at least one of Doppler property, delay property and spatial receive parameter. The channel estimation parameter may be an interpolation coefficient for channel estimation.

In the present embodiment, the at least one large-scale property of the channel of the first signal and/or the first DMRS port of the first signal is acquired jointly through the channels of the plurality of first reference signals, thus the accuracy of the at least one large-scale property can be improved. In addition, the at least one channel estimation parameter is acquired jointly through the channels of the plurality of first reference signals, thus the accuracy of the at least one channel estimation parameter can be improved.

Exemplarily, the indication information is used to indicate that the first signal satisfies the first quasi co-location QCL relationship with the plurality of first reference signals, and the first QCL relationship includes that a channel of the first signal and/or a channel of the first DMRS port is associated with at least one large-scale property of channels of the plurality of first reference signals, and the channel of the first signal is an equivalent channel corresponding to the channels of the plurality of first reference signals.

Exemplarily, the indication information is used to indicate that the first DMRS port of the first signal satisfies the first quasi co-location QCL relationship with the plurality of first reference signals, and the first QCL relationship includes that a channel of the first signal and/or a channel of the first DMRS port is associated with at least one large-scale property of channels of the plurality of first reference signals, and the channel of the first DMRS port of the first signal is an equivalent channel corresponding to the channels of the plurality of first reference signals.

Exemplarily, transmission antennas of the plurality of first reference signals are different, and the first signal is transmitted simultaneously on the transmission antennas respectively corresponding to the plurality of first reference signals.

In an embodiment, without considerations of noise, the channel of the first signal can be equal to a sum of channels of the plurality of first reference signals. After an equivalent channel is obtained through addition of the channels of the plurality of first reference signals, the channel estimation can be performed on the equivalent channel when performing the channel estimation on the channel of the first signal.

In an embodiment, without considerations of noise, the channel of the first signal can be equal to a channel obtained after precoding matrix transformation of channels of the plurality of first reference signal. After an equivalent channel is obtained by performing precoding processing on the channels of the plurality of first reference signals, the channel estimation can be performed on the equivalent channel when performing the channel estimation on the channel of the first signal.

In the present embodiment, the equivalent channel can be determined according to the channels of the first reference signals, and the channel estimation is performed on the equivalent channel, and the channel estimation can be achieved simply and efficiently.

In addition, in case transmission antennas of the plurality of first reference signals are different, the first signal may be transmitted simultaneously on the transmission antennas respectively corresponding to the plurality of first reference signals.

Further, when jointly acquiring at least one large-scale property of the channel of the first signal according to the channels of the plurality of first reference signals: the terminal device may obtain an equivalent channel through the channels of the plurality of first reference signals, and determine the at least one large-scale property of the channel of the first signal according to the equivalent channel; or the terminal device may determine at least one large-scale property corresponding to a channel of each first reference signal according to the channels of the plurality of first reference signals, and determine at least one large-scale property of the channel of the first signal according to the at least one large-scale property corresponding to the channel of each first reference signal.

In one embodiment, when determining at least one large-scale property, the terminal device may process the channels of the plurality of first reference signals (e.g., adding, or multiplying by a pre-coding matrix, or the like) to obtain an equivalent channel, and the at least one large-scale property of the channel of the first signal can be determined according to the equivalent channel, for example, the large-scale property corresponding to the channels of the plurality of first reference signals can be determined as at least one large-scale property of a channel of a signal to be processed. In one embodiment, the large-scale property corresponding to the channels of the plurality of first reference signals can be weighted to determine at least one large-scale property of a channel of a signal to be processed. In this way, the result of the at least one large-scale property can be more accurate.

When determining the at least one large-scale property, the terminal device may also first determine at least one large-scale property corresponding to the channel of each first reference signal, and then perform joint processing on the at least one large-scale property corresponding to the channel of each first reference signal to determine the at least one large-scale property of the channel of the first signal, where the joint processing can be linear superposition; or the terminal device may determine a weight corresponding to each first reference signal while determining the at least one large-scale property corresponding to the channel of each first reference signal, and then perform weighted superposition on the at least one large-scale property corresponding to the channel of each first reference signal based on the weight. In this way, the accuracy of the at least one large-scale property of the channel of the first signal can be improved. For example, with an example where the at least one large-scale property is Doppler shift, the terminal device can perform channel estimation on the plurality of first reference signals separately to obtain Doppler shifts corresponding to channels of individual first reference signals, and then the terminal device performs weighted summation for these Doppler shifts according to received signal strength of the individual first reference signals, and takes a result of the weighted summation as Doppler shift of the channel of the first signal. Using this Doppler shift, the terminal device can find a time domain difference coefficient in performing the channel estimation of the first signal, and use the coefficient to perform channel estimation.

Further, when jointly acquiring at least one channel estimation parameter according to the channels of the plurality of first reference signals: the terminal device may obtain an equivalent channel through the channels of the plurality of first reference signals, and determine at least one channel estimation parameter of the channel of the first signal according to the equivalent channel; or the terminal device may determine at least one channel estimation parameter corresponding to a channel of each first reference signal according to the channels of the plurality of first reference signals, and determine at least one channel estimation parameter of the channel of the first signal according to the at least one channel estimation parameter corresponding to the channel of each first reference signal.

In one embodiment, when determining at least one channel estimation parameter, the terminal device may add the channels of the plurality of first reference signals to obtain an equivalent channel, and the at least one channel estimation parameter of the channel of the first signal can be determined according to the equivalent channel, for example, the channel estimation parameter corresponding to the channels of the plurality of first reference signals can be directly determined as the at least one channel estimation parameter of the channel of the first signal. In one embodiment, the channel estimation parameter corresponding to the channels of the plurality of first reference signals can be weighted to determine the at least one channel estimation parameter of the channel of the first signal. In this way, the result of the at least one channel estimation parameter can be more accurate.

When determining the at least one channel estimation parameter, the terminal device may also first determine at least one channel estimation parameter corresponding to the channel of each first reference signal, and then perform joint processing on the at least one channel estimation parameter corresponding to the channel of each first reference signal to determine the at least one channel estimation parameter of the channel of the first signal, where the joint processing can be linear superposition; or the terminal device may determine a weight corresponding to each first reference signal while determining the at least one channel estimation parameter corresponding to the channel of each first reference signal, and then perform weighted superposition on the at least one channel estimation parameter corresponding to the channel of each first reference signal based on the weight. In this way, the accuracy of the at least one channel estimation parameter of the channel of the first signal can be improved.

Exemplarily, the above-described first signal may be a signal on an antenna port or a layer, and/or, the first reference signal is a signal on an antenna port.

In one embodiment, the terminal device may perform channel estimation on a channel of a first signal on a same antenna port or a same layer based on first reference signals, where the plurality of first reference signals may be signals on a same antenna port, or signals on different antenna ports. In addition, the plurality of first reference signals on the same antenna port can be used to perform channel estimation on a channel of a first signal on a different antenna port or a different layer.

In the present embodiment, in case a channel of a first signal on a same antenna port or a same layer is estimated through first reference signals or a channel of a first signal is estimated through first reference signals on a same antenna port, the accuracy of the channel estimation can be improved.

Exemplarily, the first signal may include at least one of the following signals: a physical downlink shared channel (PDSCH), a physical downlink control channel (PDCCH), a demodulation reference signal (DMRS), a channel state information reference signal CSI-RS, a tracking reference signal TRS, a physical uplink shared channel (PUSCH), a physical uplink control channel (PUCCH), and a sounding reference signal (SRS).

For example, the first signal may include any of the foregoing signals, or may include several of the foregoing signals, for example, may include the PDSCH and the PDCCH, or include the PDSCH, the PDCCH and the DMRS, etc.

In addition, the first signal can be transmitted simultaneously from transmission/reception points (TRPs), and the plurality of first reference signals included in the indication information are transmitted to different TRPs of the plurality of TRPs. In this way, the terminal device can obtain a large-scale property or a channel estimation parameter corresponding to paths of individual TRPs by performing channel estimation on the plurality of first reference signals, and a more accurate large-scale property or channel estimation parameter of the first signal can be obtained.

In one embodiment, the first signal is transmitted from TRPs simultaneously, and occupies exactly a same time domain resource and frequency domain resource on the plurality of TRPs. In one embodiment, the first signal can be transmitted on the same TRP.

For example, if the first signal is a PDSCH or a PDCCH, the PDSCH or the PDCCH and a DMRS corresponding thereto can be transmitted on the same TRP, and any data stream and any DMRS port of the PDSCH or the PDCCH adopt the following transmission mode: being transmitted simultaneously from TRPs, and occupying exactly a same time domain resource and frequency domain resource on the plurality of TRPs.

Exemplarily, the plurality of first reference signals are transmitted to different TRPs of the plurality of TRPs, respectively.

In addition, in order to improve the accuracy of the terminal device to determine a large-scale property, the plurality of TRPs for transmitting the first signal can be divided into two groups, where the TRPs whose beam direction is orientated towards a train running direction are divided into one group, the TRPs whose beam direction is orientated towards an opposite direction of the train running direction are divided into the other group, and the plurality first reference signals can be transmitted to different TRP groups.

Exemplarily, the channel of the first signal and/or the first DMRS port of the first signal may be a channel on a same time-frequency resource block.

In one embodiment, the terminal device can perform, according to the indication information, channel estimation on the channel of the first signal located in a same time-frequency resource block based on the plurality of first reference signals.

In the present embodiment, by performing the channel estimation on the channel of the first signal located in the same time-frequency resource block, the accuracy of the channel estimation can be improved.

Further, the above-described indication information includes identification of the plurality of first reference signals and a parameter used to indicate the at least one large-scale property.

Exemplarily, an indication manner of the above-described indication information includes: indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In an embodiment, if a large-scale property of a channel experienced by a symbol on an antenna port can be inferred from a channel experienced by a symbol on another antenna port, then the two antenna ports are in QCL. The large-scale property may include delay spread, average delay, Doppler spread, Doppler delay, average gain, and spatial receive parameter, etc.

In an embodiment, if a large-scale property of a channel experienced by a symbol on an antenna port can be inferred from a channel experienced by respective symbols on a group of antenna ports, then the antenna port and the group of antenna ports can be said to be in QCL. The large-scale property may include delay spread, average delay, Doppler spread, Doppler delay, average gain, and spatial receive parameter, etc.

In an embodiment, the indication information may be indicated in the following manner: indicating, respectively for each first reference signal of the plurality of first reference signals, a parameter used to indicate a corresponding large-scale property of the first reference signal. In this way, the terminal device can determine at least one large-scale property of the channel of the first signal according to the parameter indicating the corresponding large-scale property of each first reference signal.

Further, the indication information may also be indicated in the following manner: indicating at least one parameter used to indicate a large-scale property, and indicating, respectively for each parameter used to indicate the large-scale property, a first reference signal corresponding to the parameter. In this way, the terminal device may determine at least one large-scale property of the channel of the first signal according to the parameter used to indicate the large-scale property as well as the plurality of first reference signals corresponding to each parameter used to indicate the large-scale property.

In an embodiment, the parameter used to indicate the large-scale property is a QCL type, the indication information includes at least two QCL types, and the at least two QCL types include at least one of the following: a first QCL type and a second QCL type; a first QCL type, a second QCL type and a third QCL type; a second QCL type and a fourth QCL type; and a second QCL type, a third QCL type and a fourth QCL type; where the first QCL type includes Doppler shift, Doppler spread, average delay and delay spread; the second QCL type includes Doppler shift and Doppler spread; the third QCL type includes spatial receive parameter; and the fourth QCL type includes average delay and delay spread.

In a new radio (NR) system, the following four QCL types are mainly included, respectively QCL-type A (Type A): {Doppler shift, Doppler spread, average delay, delay spread}, QCL-type B (Type B): {Doppler shift, Doppler spread}, QCL-type C (Type C): {Doppler shift, average delay}, QCL-type D (Type D): {spatial receive parameter (Spatial Rx parameter)}, QCL-TypeE (Type E): {average delay, delay spread}.

Doppler shift and Doppler spread can be Doppler properties, and the average delay and the delay spread can be delay properties.

In the prior art, for the NR system, the QCL relationship between reference signals is configured through a transmission configuration indicator (TCI) which may have a structure of {RS1|QCL-Type1, RS2|QCL-Type2} or {RS1|QCL-Type1}, where RS1 and RS2 are identification information of downlink reference signals, and QCL-Type1 and QCL-Type2 are QCL types. Each TCI state may include 1 or 2 downlink reference signals, and the corresponding QCL type. The downlink reference signal configured in the TCI may be an SSB or a CSI-RS, and the QCL type can be one of the above-described four QCL types. If one reference signal is configured with a TCI, its QCL source signal as well as QCL type can be determined from the configuration of the TCI.

It should be noted that if two QCL types are contained in the prior art TCI, the corresponding QCL parameters cannot overlap. For example, Type A corresponds to Doppler shift, Doppler spread, the average delay and the delay spread, and Type D corresponds to the spatial receive parameter, respectively; these two QCL types do not overlap, so they belong to a feasible combination of QCL types, that is, they can be configured in one TCI. However, Type A, Type B and Type C have large-scale parameter overlapped, so they cannot be configured in the same TCI. In addition, if two identical reference signals are configured in a TCI, such as two SSBs, the two identical reference signals cannot correspond to a same QCL type. For example, QCL information of type A and type D can be acquired for a PDSCH DMRS, from a TRS and a beam management CSI-RS respectively. If the TRS can be used as a reference for QCL-type A of the DMRS and the beam management CSI-RS is used as a reference for QCL-type D, the TCI then should be {CSI-RS0|QCL-type A, CSI-RS1|QCL-type D}, where the CSI-RS0 is a CSI-RS for enabling a TRS function and the CSI-RS1 is a CSI-RS for beam management.

From the above description, it can be seen that, in the prior art, if a TCI contains two QCL types, the QCL parameters corresponding to the QCL types cannot overlap. In contrast, in an embodiment of the present application, in case each first reference signal corresponds to at least two QCL types or the indication information includes at least two QCL types, the at least two QCL types may include at least one of the following: a first QCL type and a second QCL type; a first QCL type, a second QCL type and a third QCL type; a second QCL type and a fourth QCL type; and a second QCL type, a third QCL type and a fourth QCL type; where the first QCL type includes Doppler shift, Doppler spread, average delay and delay spread; the second QCL type includes Doppler shift and Doppler spread; the third QCL type includes spatial receive parameter; and the fourth QCL type includes average delay and delay spread.

It should be noted that both the first QCL type and the second QCL type include Doppler shift and Doppler spread therein. Therefore, compared with the prior art, in case the indication information includes two QCL types, there might be an overlap for QCL parameters corresponding to the QCL types, and thus the flexibility of configuration of the QCL types can be improved.

In an embodiment, the indication information may also include the following QCL types: a first QCL type; a first QCL type and a third QCL type; a first QCL type and a fifth QCL type; a first QCL type, a third QCL type and a fifth QCL type; a fourth QCL type and a fifth QCL type; and a third QCL type, a fourth QCL type and a fifth QCL type, where the fifth QCL type corresponds to the above-described QCL-type C (Type C) including Doppler shift and the average delay.

In one embodiment, in case the first QCL type and the third QCL type are included in the indication information, TCI state information is included in the indication information, where the TCI state information may include three reference signals, respectively TRS1, TRS2 and TRS3, among them, the QCL type corresponding to TRS1 and TRS2 is the first QCL type, the QCL type corresponding to TRS3 is the third QCL type; alternatively, the TCI state information may also include three reference signals, respectively TRS1, TRS2 and CSI-RS, where the QCL type corresponding to TRS1 and TRS2 is the first QCL type, the QCL type corresponding to CSI-RS is the third QCL type; alternatively, the TCI state information may also include three reference signals, respectively TRS1, TRS2 and CSI-RS for CSI acquisition, where the QCL type corresponding to TRS1 and TRS2 is the first QCL type, the QCL type corresponding to CSI-RS for CSI acquisition is the third QCL type; alternatively, the TCI state information may also include two reference signals, respectively TRS1 and TRS2, where the QCL type corresponding to one of TRS1 and TRS2 is the first QCL type, the QCL type corresponding to the other one of TRS1 and TRS2 includes the first QCL type and the third QCL type; alternatively, the TCI state information may also include three reference signals, respectively CSI-RS1 for CSI acquisition, CSI-RS2 for CSI acquisition and CSI-RS3 for CSI acquisition, where the QCL type corresponding to CSI-RS1 for CSI acquisition and CSI-RS2 for CSI acquisition is the first QCL type, the QCL type corresponding to CSI-RS3 for CSI acquisition is the third QCL type; alternatively, the TCI state information may also include three reference signals, respectively CSI-RS1 for CSI acquisition, CSI-RS2 for CSI acquisition and CSI-RS for CSI acquisition, where the QCL type corresponding to CSI-RS1 for CSI acquisition and CSI-RS2 for CSI acquisition is the first QCL type, the QCL type corresponding to CSI-RS for CSI acquisition is the third QCL type; alternatively, the TCI state information may also include two reference signals, respectively CSI-RS1 for CSI acquisition and CSI-RS2 for CSI acquisition, where the QCL type corresponding to one of CSI-RS1 for CSI acquisition and CSI-RS2 for CSI acquisition is the first QCL type, the QCL type corresponding to the other one of CSI-RS1 and CSI-RS2 includes the first QCL type and the third QCL type. In one embodiment, the TCI state information may also include two reference signals, respectively TRS1 and TRS2, where the QCL type corresponding to both TRS1 and TRS2 comprises the first QCL type and the third QCL type; alternatively, the TCI state information may also include CSI-RS1 for CSI acquisition and CSI-RS2 for CSI acquisition, and CSI-RS1 and CSI-RS2, where the QCL type corresponding to both CSI-RS1 for CSI acquisition and CSI-RS2 for CSI acquisition includes the first QCL type and the third QCL type.

In an embodiment, the indication information may include three pieces of TCI state information, where TCI state 1 is associated with TRP1, TCI state 2 is associated with TRP2, and TCI state 3 is used for SFN transmission. TCI state 1 includes the first QCL type, TCI state 2 includes the first QCL type, and TCI state 3 includes the third QCL type.

In an embodiment, the indication information may include two pieces of TCI state information, where TCI state 1 is associated with TRP1, TCI state 2 is associated with TRP2, and an SFN reference signal can be configured in either TCI state. Among them, TCI state 1 includes the first QCL type and the third QCL type, TCI state 2 includes the first QCL type; or, TCI state 1 includes the first QCL type, TCI state 2 includes the first QCL type and the third QCL type; or, TCI state 1 includes the first QCL type and the third QCL type, TCI state 2 includes the first QCL type and the third QCL type.

In an embodiment, in case reference signals RSs of the third QCL type and the first QCL in a same TCI state are different, reference signals RSs of the third QCL type in two TCI states are the same. In an embodiment, two reference signals RSs of two third QCL type are different.

In an embodiment, TCI state 1 includes only reference signals RSs of the first QCL type, respectively RS1 and RS2; TCI state 2 includes reference signals RSs of the third QCL type, respectively RS3 and RS4, or RS5.

In an embodiment, TCI state 1 includes a reference signal RS1 of the first QCL type and a reference signal RS3 of the third QCL type, TCI state 2 includes a reference signal RS2 of the first QCL type.

In an embodiment, TCI state 1 includes a reference signal RS1 of the first QCL type and a reference signal RS3 of the third QCL type, TCI state 2 includes a reference signal RS2 of the first QCL type and a reference signal RS4 of the third QCL type.

Exemplarily, in case the indication information includes the first QCL type and the fifth QCL type, or includes the first QCL type, the third QCL type and the fifth QCL type, the reference signal used for delay property estimation is different from the reference signal used for Doppler estimation.

In an embodiment, the indication information includes a reference signal of the first QCL type and a reference signal of the fifth QCL type, where the reference signal of the first QCL type is used for delay property determination, and the reference signal of the first QCL type and the reference signal of the fifth QCL type are jointly used for Doppler property determination.

In an embodiment, the indication information includes one reference signal of the first QCL type and two reference signals of the fifth QCL type, where the reference signal of the first QCL type is used for delay property determination, and the two reference signals of the fifth QCL type are used for Doppler property determination.

Among them, the reference signal of the first QCL type and the reference signals of the fifth QCL type may be the same or different.

In an embodiment, the indication information includes TCI state information, where the TCI state information may include three reference signals, respectively TRS1, TRS2 and TRS3, among them, the QCL type corresponding to TRS1 includes the first QCL type and the third QCL type, the QCL type corresponding to TRS2 and TRS3 is the fifth QCL type, or, the QCL type corresponding to TRS1 is the first QCL type, the QCL type corresponding to both TRS2 and TRS3 comprises the fifth QCL type and the third QCL type. In one embodiment, the TCI state information may include four reference signals, respectively TRS1, TRS2, TRS3 and CSI-RS for CSI acquisition, where the QCL type corresponding to TRS1 is the first QCL type, the QCL type corresponding to TRS2 and TRS3 is the fifth QCL type, and the QCL type corresponding to CSI-RS for CSI acquisition is the third QCL type. In one embodiment, the TCI state information may also include three reference signals, respectively CSI-RS1 for CSI acquisition, CSI-RS2 for CSI acquisition and CSI-RS3 for CSI acquisition, where the QCL type corresponding to CSI-RS1 for CSI acquisition is the first QCL type and the third QCL type, the QCL type corresponding to CSI-RS2 for CSI acquisition and CSI-RS3 for CSI acquisition is the fifth QCL type; or, the QCL type corresponding to CSI-RS1 for CSI acquisition is the first QCL type, the QCL type corresponding to both CSI-RS2 for CSI acquisition and CSI-RS3 for CSI acquisition includes the fifth QCL type and the third QCL type. In one embodiment, the TCI state information may also include two reference signals, respectively CSI-RS1 for CSI acquisition and CSI-RS2 for CSI acquisition, where the QCL type corresponding to CSI-RS1 for CSI acquisition is the fifth QCL type, the QCL type corresponding to CSI-RS2 for CSI acquisition is the fifth QCL type.

In an embodiment, TCI state 1 includes only a reference signal RS1 of the first QCL type; TCI state 2 includes reference signals RSs of the fifth QCL type, respectively RS2 and RS3, or RS2; TCI state 3 includes a reference signal RS of the third QCL type, respectively RS1 or RS4.

In an embodiment, the indication information may include three pieces of TCI state information, where TCI state 1 is associated with TRP1, TCI state 2 is associated with TRP2, and TCI state 3 is used for SFN transmission.

TCI state 1 includes the fifth QCL type, TCI state 2 includes the fifth QCL type, and TCI state 3 includes the first QCL type and the third QCL type.

In an embodiment, the indication information may include two pieces of TCI state information, where TCI state 1 is associated with TRP1, TCI state 2 is associated with TRP2, and an SFN reference signal can be configured in either TCI state. TCI state 1 includes the first QCL type and the third QCL type, TCI state 2 includes the fifth QCL type; or, TCI state 1 includes the first QCL type and the fifth QCL type, TCI state 2 includes the third QCL type and the fifth QCL type; or, TCI state 1 includes the first QCL type, the third QCL type and the fifth QCL type, TCI state 2 includes the fifth QCL type; or, TCI state 1 includes the first QCL type and the third QCL type, TCI state 2 includes the first QCL type, the third QCL type and the fifth QCL type.

In an embodiment, reference signals corresponding to the first QCL type in two TCI states are the same, and reference signals corresponding to the third QCL type are the same or different.

In an embodiment, TCI state 1 includes a reference signal RS1 of the first QCL type and a reference signal RS2 of the fifth QCL type, TCI state 2 includes a reference signal RS1 or RS4 of the third QCL type, and in addition, TCI state 2 may also include a reference signal RS3 of the fifth QCL type.

Exemplarily, if the indication information includes the fourth QCL type and the fifth QCL type, or includes the third QCL type, the fourth QCL type and the fifth QCL type, where a reference signal of the fourth QCL type is used for delay property determination, where a reference signal for delay property estimation is different from a reference signal for Doppler property estimation.

In an embodiment, the indication information includes one reference signal of the fourth QCL type and two reference signals of the fifth QCL type, where the reference signal of the fourth QCL type is used for delay property determination and the two reference signals of the fifth QCL type are used for Doppler property determination.

In an embodiment, the reference signal of the fourth QCL type and the reference signals of the fifth QCL type can be the same or different.

The first QCL type corresponds to the above-described QCL-type A, the second QCL type corresponds to the above-described QCL-type B, the third QCL type corresponds to the above-described QCL-type D, the fourth QCL type corresponds to the above-described QCL-type E, and the fifth QCL type corresponds to the above-described QCL-type C.

Exemplarily, the terminal device may perform, according to the indication information, the channel estimation of the first signal based on the plurality of first reference signals, in the following manners: determining Doppler property of the channel of the first signal according to at least one first reference signal for which a corresponding QCL type is a first QCL type and at least one first reference signal for which a corresponding QCL type is a second QCL type; or determining the Doppler property of the channel of the first signal according to first reference signals for which a QCL type is the second QCL type; or determining the Doppler property of the channel of the first signal according to first reference signals for which a QCL type is the first QCL type;

The first QCL type includes Doppler shift, Doppler spread, average delay and delay spread, and the second QCL type includes Doppler shift and Doppler spread.

In one embodiment, if the QCL types configured in the indication information include the first QCL type and the second QCL type, since both the first QCL type and the second QCL type include Doppler shift and Doppler spread, the terminal device can determine the Doppler property of the channel of the first signal according to at least one first reference signal for which a QCL type is the first QCL type and at least one first reference signal for which a QCL type is the second QCL type, that is, determine Doppler shift and Doppler spread.

Exemplarily, the indication information further includes the first QCL type used to indicate the large-scale property of the first reference signals, and the second QCL type used to indicate the large-scale property of the first reference signals.

If the QCL types configured in the indication information include the second QCL type, since the second QCL type includes Doppler shift and Doppler spread, the terminal device can determine the Doppler property of the channel of the first signal according to the plurality of first reference signal for which the QCL type is the second QCL type, that is, determine Doppler shift and Doppler spread.

Exemplarily, the indication information further includes the second QCL type used to indicate the large-scale property of the first reference signals.

If the QCL types configured in the indication information include the first QCL type, since the first QCL type includes Doppler shift and Doppler spread, the terminal device can determine the Doppler property of the channel of the first signal according to the plurality of first reference signals for which the QCL type is the first QCL type, that is, determine Doppler shift and Doppler spread.

Exemplarily, the indication information further includes the first QCL type used to indicate the large-scale property of the first reference signals.

The QCL type is a parameter used to indicate a large-scale property, a large-scale property indicated by the first QCL type includes Doppler shift, Doppler spread, the average delay and the delay spread, and a large-scale property indicated by the second QCL type includes Doppler shift and Doppler spread.

In the present embodiment, the terminal device can simply and efficiently determine the Doppler property of the channel of the first signal according to the first reference signals configured in the first QCL type and/or the first reference signals configured in the second QCL type.

Further, in case the above-described at least one large-scale property includes the Doppler property, the terminal device may further determine a reference property of the channel of the first signal according to a second reference signal, where the second reference signal is part of or all of the plurality of first reference signals, or, the second reference signal is a reference signal different from the plurality of first reference signals; the reference property is different from the Doppler property.

Exemplarily, the indication information further includes information indicating that the second reference signal satisfies a second QCL relationship with the first signal/the first DMRS port of the first signal, where the second QCL relationship includes that the channel of the first signal and/or the channel of the first DMRS port is associated with the reference property of a channel of the second reference signal; the second reference signal is part of or all of the plurality of first reference signals, or, the second reference signal is a reference signal different from the plurality of first reference signals; the reference property is different from the Doppler property.

Exemplarily, the reference property may include the delay property and/or the spatial receive parameter, where the delay property includes the average delay and/or the delay spread, and the spatial receive parameter (Spatial Rx parameter) may be, for example, a spatial receive beam.

In one embodiment, in case the network device transmits the indication information to the terminal device, the indication information may also include identification information of second reference signals, and the terminal device will determine the reference property of the channel of the first signal according to the plurality of second reference signals. The second reference signals can be a part of reference signals of the plurality of first reference signals, which can also be comprehended as the second reference signals being the same as the part of reference signals of the plurality of first reference signals. In one embodiment, the second reference signals can be reference signals completely different from the plurality of first reference signals.

It is worth noting that second reference signals for delay property determination can be exactly identical to first reference signals for Doppler property determination if the reference property includes the delay property, or, second reference signals for spatial receive parameter determination may be exactly identical to the plurality of first reference signals for Doppler property determination if the reference property includes the spatial receive parameter, or, second reference signals for spatial receive parameter determination may not be exactly identical to first reference signals for Doppler property determination if the reference property includes the spatial receive parameter.

In the present embodiment, the terminal device may also determine the reference property of the channel of the first signal according to the second reference signals, and the channel of the first signal can be performed with channel estimation according to the Doppler property and the reference property, and the accuracy of the channel estimation can be improved.

Exemplarily, the terminal device may determine the reference property of the channel of the first signal in the following manners: determining the reference property of the channel of the first signal according to second reference signals for which a QCL type is a first QCL type; or determining the reference property of the channel of the first signal according to second reference signals for which a QCL type is a fourth QCL type.

Exemplarily, the indication information further includes a first QCL type used to indicate the large-scale property of the second reference signals.

Exemplarily, the indication information further includes a fourth QCL type used to indicate the large-scale property of the second reference signals.

A QCL type is a parameter used to indicate the large-scale property, and the first QCL type includes Doppler shift, Doppler spread, average delay and delay spread, and the fourth QCL type includes the average delay and the delay spread.

In one embodiment, the indication information may include at least one QCL type corresponding to each second reference signal of second reference signals; alternatively, the indication information may also include at least one QCL type and second reference signals corresponding to each QCL type, if the QCL type configured in the indication information includes the first QCL type, since the first QCL type includes the average delay and the delay spread, the terminal device may determine the reference property of the channel of the first signal according to second reference signals for which a QCL type is the first QCL type, that is, determine the average delay and the delay spread.

If the QCL type configured in the indication information includes the fourth QCL type, since the fourth QCL type includes the average delay and the delay spread, the terminal device may determine the reference property of the channel of the first signal according to second reference signals for which a QCL type is the fourth QCL type, that is, determine the average delay and the delay spread.

In the present embodiment, the terminal device can simply and efficiently determine the reference property of the channel of the first signal according to the second reference signals configured in the first QCL type or the first reference signals configured in the fourth QCL type.

Exemplarily, if the indication information includes identification information of the plurality of first reference signals, the identification information of the first reference signals can be configured in a variety of manners. In one possible implementation, the indication information includes at least one piece of TCI state information, then the identification information of the plurality of first reference signals is contained in a same piece of TCI state information.

For example, assuming that there are two first reference signals, identification information of these two first reference signals can be contained in a same piece of TCI state information.

In another possible implementation, if the indication information includes plural pieces of TCI state information, then identification information of the plurality of first reference signals is contained in the plural pieces of TCI state information, and each piece of TCI state information at most includes identification information of one first reference signal.

For example, assuming that the indication information includes three pieces TCI state information, respectively TCI state information A, TCI state information B and TCI state information C, and two first reference signals are included, respectively reference signal 1 and reference signal 2, then reference signal 1 can be contained in TCI A and reference signal 2 can be contained in TCI B.

In another possible implementation, the indication information includes one or more pieces of TCI state information, where each piece of TCI state information includes one or more pieces of large-scale property indication information, in case plural pieces of TCI state information are included, different pieces of TCI state information include large-scale property indication information indicating different large-scale properties.

In one embodiment, in case the indication information includes plural pieces of TCI state information, different pieces of TCI state information include large-scale property indication information indicating different large-scale properties. For example, if the indication information includes TCI state information A and TCI state information B, where the large-scale property indicated by the large-scale property indication information included in TCI state information A includes Doppler property, and the large-scale property indicated by the large-scale property indication information included in TCI state information B may include delay property and/or spatial receive parameter.

In the present embodiment, the identification information of the first reference signals may be configured in a TCI state information in different manners, and the flexibility of configuration of the identification information of the first reference signals can be improved.

The following gives specific examples to show the configuration of first reference signals, at least one QCL type corresponding to the first reference signals, and how to determine a large-scale property of the channel of the first signal according to the first reference signals. It should be noted that illustrations are made hereunder in the following examples where the indication information includes at least one piece of TCI state information and the identification information of the plurality of first reference signals is contained in the at least one piece of TCI state information.

Example 1: in this example where the indication information includes 2 pieces of TCI state information, and the specific configuration can be shown in Table 1 as follows:

TABLE 1

| TCI sate 1 | TCI sate 2 |
|---|---|
| RS1 \| QCL-Type A | RS2 \| QCL-Type A |

In the foregoing example, the indication information includes two pieces TCI state information, where each piece of TCI state information includes identification information of one first reference signal. RS1 and RS2 are identification information of the first reference signals, the channel of RS1 and RS2 has an association relationship with the channel of the first signal in terms of the following large-scale property {Doppler shift, Doppler spread, average delay, delay spread}, and the terminal device can obtain {Doppler shift, Doppler spread, average delay, delay spread} of the channel of the first signal according to {Doppler shift, Doppler spread, average delay, delay spread} of the channel of RS1 and RS2.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 2: in this example where the indication information includes 2 pieces of TCI state information, and the specific configuration can be shown in Table 2 as follows:

TABLE 2

| TCI sate 1 | TCI sate 2 |
|---|---|
| RS1 \| QCL-Type A | RS2 \| QCL-Type A |
| RS1 \| QCL-Type D | RS2 \| QCL-Type D |

In the foregoing example, the indication information includes two pieces TCI state information, where each piece of TCI state information includes identification information of one first reference signal, and each first reference signal corresponds to two QCL types, respectively QCL-Type A and QCL-Type D. RS1 and RS2 are identification information of the first reference signals, the channel of RS1 and RS2 has an association relationship with the channel of the first signal in terms of the following large-scale property {Doppler shift, Doppler spread, average delay, delay spread, Spatial Rx parameter}, and the terminal device can obtain {Doppler shift, Doppler spread, average delay, delay spread, Spatial Rx parameter} of the channel of the first signal according to {Doppler shift, Doppler spread, average delay, delay spread, Spatial Rx parameter} of the channel of RS1 and RS2.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 3: in this example where the indication information includes 2 pieces of TCI state information, and the specific configuration can be shown in Table 3 as follows:

TABLE 3

| TCI sate 1 | TCI sate 2 |
|---|---|
| RS1 \| QCL-Type A<br>RS3 \| QCL-Type D | RS2 \| QCL-Type A<br>RS4 \| QCL-Type D |

In the foregoing example, the indication information includes two pieces TCI state information, where each piece of TCI state information includes identification information of two first reference signals, and each first reference signal corresponds to one QCL type. That is, each piece of TCI state information includes: a first reference signal for delay property determination and Doppler property determination of the first signal; and a first reference signal for spatial receive parameter determination of the first signal.

RS1, RS2, RS3 and RS4 are identification information of the first reference signals, the channel of RS1 and RS2 has an association relationship with the channel of the first signal in terms of the following large-scale property {Doppler shift, Doppler spread, average delay, delay spread}, and the terminal device can obtain {Doppler shift, Doppler spread, average delay, delay spread} of the channel of the first signal according to {Doppler shift, Doppler spread, average delay, delay spread} of the channel of RS1 and RS2; the channel of RS3 and RS4 has an association relationship with the channel of the first signal in terms of the following large-scale property {Spatial Rx parameter}, and the terminal device can obtain the spatial receive parameter of the channel of the first signal according to the spatial receive parameter of the channel of RS3 and RS4.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 4: in this example where the indication information includes 2 pieces of TCI state information, and the specific configuration can be shown in Table 4 as follows:

TABLE 4

| TCI sate 1 | TCI sate 2 |
|---|---|
| RS1 \| QCL-Type A | RS2 \| QCL-Type B |

In the foregoing example, the indication information includes two pieces TCI state information, where each piece of TCI state information includes identification information of one first reference signal, and each first reference signal corresponds to one QCL type. RS1 and RS2 are identification information of the first reference signals, the channel of RS1 has an association relationship with the channel of the first signal in terms of the following large-scale property {Doppler shift, Doppler spread, average delay, delay spread} and the channel of RS2 has an association relationship with the channel of the first signal in terms of the following large-scale property {Doppler shift, Doppler spread}, the terminal device can obtain {Doppler shift, Doppler spread} of the channel of the first signal according to {Doppler shift, Doppler spread} of the channel of RS1 and RS2, and the terminal device can obtain {average delay, delay spread} of the channel of the first signal according to {average delay, delay spread} of the channel of RS1.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 5: in this example where the indication information includes 2 pieces of TCI state information, and the specific configuration can be shown in Table 5 as follows:

TABLE 5

| TCI sate 1 | TCI sate 2 |
|---|---|
| RS1 \| QCL-Type A<br>RS3 \| QCL-Type D | RS2 \| QCL-Type B<br>RS4 \| QCL-Type D |

In the foregoing example, the indication information includes two pieces TCI state information, where each piece of TCI state information includes identification information of two first reference signals, and each first reference signal corresponds to one QCL type. Each piece of TCI state information includes: a first reference signal for Doppler property determination of the first signal; and a first reference signal for spatial receive parameter determination of the first signal. In addition, TCI state 2 further includes the first reference signal for delay property determination of the first signal.

RS1, RS2, RS3 and RS4 are identification information of the first reference signals, the channel of RS1 has an association relationship with the channel of the first signal in terms of the following large-scale property {Doppler shift, Doppler spread, average delay, delay spread}, the channel of RS2 has an association relationship with the channel of the first signal in terms of the following large-scale property {Doppler shift, Doppler spread}, the terminal device can obtain {Doppler shift, Doppler spread} of the channel of the first signal according to {Doppler shift, Doppler spread} of the channel of RS1 and RS2, and the terminal device can obtain {average delay, delay spread} of the channel of the first signal according to {average delay, delay spread} of the channel of RS1; the spatial receive parameter of RS3 and RS4 is the same as the spatial receive parameter of the first signal, and the terminal device can obtain the spatial receive parameter of the channel of the first signal according to the spatial receive parameter of the channel of RS3 and RS4.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 6: in this example where the indication information includes 2 pieces of TCI state information, and the specific configuration can be shown in Table 6 as follows:

TABLE 6

| TCI sate 1 | TCI sate 2 |
|---|---|
| RS1 \| QCL-Type A | RS2 \| QCL-Type B |
| RS1 \| QCL-Type D | RS2 \| QCL-Type D |

In the foregoing example, the indication information includes two pieces TCI state information, where each piece of TCI state information includes identification information of one first reference signals, and each first reference signal corresponds to two QCL types. Each piece of TCI state information includes: a first reference signal for Doppler property determination and spatial receive parameter determination of the first signal; and a first reference signal for spatial receive parameter determination of the first signal. In addition, TCI state 2 further includes the first reference signal for delay property determination of the first signal.

RS1 and RS2 are identification information of the first reference signals, the channel of RS1 has an association relationship with the channel of the first signal in terms of the following large-scale property {Doppler shift, Doppler spread, average delay, delay spread}, the channel of RS2 has an association relationship with the channel of the first signal in terms of the following large-scale property {Doppler shift, Doppler spread}, the terminal device can obtain {Doppler shift, Doppler spread} of the channel of the first signal according to {Doppler shift, Doppler spread} of the channel of RS1 and RS2, and the terminal device can obtain {average delay, delay spread} of the channel of the first signal according to {average delay, delay spread} of the channel of RS1; the spatial receive parameter of RS1 and RS2 is the same as the spatial receive parameter of the first signal, and the terminal device can obtain the spatial receive parameter of the channel of the first signal according to the spatial receive parameter of the channel of RS1 and RS2.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 7: in this example where the indication information includes 2 pieces of TCI state information, and the specific configuration can be shown in Table 7 as follows:

TABLE 7

| TCI sate 1 | TCI sate 2 |
|---|---|
| RS1 \| QCL-Type E | RS2 \| QCL-Type B |
| RS3 \| QCL-Type B | |

In the foregoing example, the indication information includes two pieces TCI state information, where TCI state 1 includes identification information RS3 of a first reference signal and identification information RS1 of a second reference signal, TCI state 2 includes identification information RS2 of one first reference signal, and each first reference signal corresponds to one QCL type. RS1, RS2 and RS3 are identification information of the reference signals, the channel of RS1 has an association relationship with the channel of the first signal in terms of the following large-scale property {average delay, delay spread}, the channel of RS2 and RS3 has an association relationship with the channel of the first signal in terms of the following large-scale property {Doppler shift, Doppler spread}, the terminal device can obtain {Doppler shift, Doppler spread} of the channel of the first signal according to {Doppler shift, Doppler spread} of the channel of RS2 and RS3, and the terminal device can obtain {average delay, delay spread} of the channel of the first signal according to {average delay, delay spread} of the channel of RS1.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 8: in this example where the indication information includes one piece of TCI state information, and the specific configuration can be shown in Table 8 as follows:

TABLE 8

| TCI sate 1 |
|---|
| RS1, RS2 \| QCL-Type A |

In the foregoing example, the indication information includes one piece of TCI state information, where TCI state 1 includes identification information of two first reference signals, and TCI state 1 includes all reference signals for determining a large-scale property or a group of large-scale properties of the first signal.

RS1 and RS2 are identification information of the first reference signals, the channel of RS1 and RS2 has an association relationship with the channel of the first signal in terms of the following large-scale property {Doppler shift, Doppler spread, average delay, delay spread}, and the terminal device can obtain {Doppler shift, Doppler spread, average delay, delay spread} of the channel of the first signal according to {Doppler shift, Doppler spread, average delay, delay spread} of the channel of RS1 and RS2.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 9: in this example where the indication information includes two pieces of TCI state information, and the specific configuration can be shown in Table 9 as follows:

TABLE 9

| TCI sate 1 | TCI sate 2 |
|---|---|
| RS1, RS2 \| QCL-Type A | RS1, RS2 \| QCL-Type D |

In the foregoing example, the indication information includes two pieces of TCI state information, where each piece of TCI state information includes identification information of two first reference signals, and TCI state 1 and TCI state 2 correspond to different large-scale properties and include all reference signals for the large-scale properties corresponding to the TCI state information. Exemplarily, TCI state 1 includes a reference signal for delay property determination and Doppler property determination of the channel of the first signal, and TCI state 2 includes a reference signal for spatial receive parameter determination of the channel of the first signal.

In addition, as shown in Table 9, the reference signals for delay property determination and Doppler property determination are the same as the reference signals for spatial receive parameter determination.

RS1 and RS2 are identification information of the first reference signals, the channel of RS1 and RS2 has an association relationship with the channel of the first signal in terms of the following large-scale property {Doppler shift, Doppler spread, average delay, delay spread, Spatial Rx parameter}, and the terminal device can obtain {Doppler shift, Doppler spread, average delay, delay spread, Spatial Rx parameter} of the channel of the first signal according to {Doppler shift, Doppler spread, average delay, delay spread, Spatial Rx parameter} of the channel of RS1 and RS2.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 10: in this example where the indication information includes two pieces of TCI state information, and the specific configuration can be shown in Table 10 as follows:

TABLE 10

| TCI sate 1 | TCI sate 2 |
|---|---|
| RS1, RS2 ∣ QCL-Type B | RS1, RS2 ∣ QCL-Type E |

The large-scale property corresponding to QCL-Type E include the average delay and the delay spread.

In the foregoing example, the indication information includes two pieces of TCI state information, where TCI state 1 includes identification information of two first reference signals, and TCI state 2 includes identification information of two first reference signals. Exemplarily, TCI state 1 includes a reference signal for Doppler property determination of the channel of the first signal, and TCI state 2 includes a reference signal for delay property determination of the channel of the first signal.

The channel of RS1 and RS2 has an association relationship with the channel of the first signal in terms of the following large-scale property {Doppler shift, Doppler spread}, the terminal device can obtain {Doppler shift, Doppler spread} of the channel of the first signal according to RS1 and RS2, and the terminal device can obtain {average delay, delay spread} of the channel of the first signal according to RS1.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 11: in this example where the indication information includes two pieces of TCI state information, and the specific configuration can be shown in Table 11 as follows:

TABLE 11

| TCI sate 1 | TCI sate 2 |
|---|---|
| RS1, RS2 ∣ QCL-Type A | RS3, RS4 ∣ QCL-Type D |

In the foregoing example, the indication information includes two pieces of TCI state information, where TCI state 1 includes identification information of two first reference signals, and TCI state 2 includes identification information of two first reference signals. Exemplarily, as shown in the above table, the reference signals for delay property determination and Doppler property determination are different from the reference signals for spatial receive parameter determination.

RS1, RS2, RS3 and RS4 are identification information of the first reference signals, the channel of RS1 and RS2 has an association relationship with the channel of the first signal in terms of the following large-scale property {Doppler shift, Doppler spread, average delay, delay spread}, the terminal device can obtain {Doppler shift, Doppler spread, average delay, delay spread} of the channel of the first signal according to {Doppler shift, Doppler spread, average delay, delay spread} of the channel of RS1 and RS2; the channel of RS3 and RS4 has an association relationship with the channel of the first signal in terms of the following large-scale property {Spatial Rx parameter}, and the terminal device can obtain the Spatial Rx parameter of the channel of the first signal according to the Spatial Rx parameter of the channel of RS1 and RS2.

The first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 12: in this example where the indication information includes 2 pieces of TCI state information, and the specific configuration can be shown in Table 12 as follows:

TABLE 12

| TCI sate 1 | TCI sate 2 |
|---|---|
| RS1 ∣ QCL-Type B | RS2 ∣ QCL-Type B |
| RS1 ∣ QCL-Type D | RS2 ∣ QCL-Type D |
| RS3 ∣ QCL-Type E | |

In the foregoing example, the indication information includes two pieces TCI state information, where TCI state 1 includes identification information RS1 of first reference signals and identification information RS3 of a second reference signal, TCI state 2 includes identification information RS2 of the first reference signals. Exemplarily, each piece of TCI state information has only one reference signal for Doppler property determination and only one reference signal for spatial receive parameter determination of the channel of the first signal, and one piece of the pieces of TCI state information includes a reference signal for delay property determination of the channel of the first signal.

RS1, RS2 and RS3 are identification information of reference signals, the channel of RS1 and RS2 has an association relationship with the channel of the first signal in terms of the following large-scale property {Doppler shift, Doppler spread, Spatial Rx parameter}, the terminal device can obtain {Doppler shift, Doppler spread, Spatial Rx parameter} of the channel of the first signal according to the channel of RS1 and RS2. The terminal device can obtain the delay property of the channel of the first signal according to the delay property of the channel of RS3.

The above-described reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 13: in this example where the indication information includes two pieces of TCI state information, and the specific configuration can be shown in Table 13 as follows:

TABLE 13

| TCI sate 1 | TCI sate 2 |
|---|---|
| RS1, RS2 | QCL-Type B | RS3 | QCL-Type E |

In the foregoing example, the indication information includes two pieces of TCI state information, where TCI state 1 includes identification information RS1 and RS2 of two first reference signals, and TCI state 2 includes identification information RS3 of one second reference signal. Exemplarily, different pieces of TCI state information correspond to different large-scale properties and include all reference signals for the large-scale properties corresponding to the TCI state information. In an embodiment, TCI state 1 includes a reference signal for Doppler property determination of the channel of the first signal, and TCI state 2 includes a reference signal for delay property determination of the channel of the first signal.

RS1, RS2 and RS3 are identification information of reference signals, the channel of RS1 and RS2 has an association relationship with the channel of the first signal in terms of the following large-scale property {Doppler shift, Doppler spread}, the terminal device can obtain {Doppler shift, Doppler spread} of the channel of the first signal according to the channel of RS1 and RS2. The terminal device can obtain the delay property of the channel of the first signal according to the delay property of the channel of RS3.

The above-described first reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 14: in this example where the indication information includes three pieces of TCI state information, and the specific configuration can be shown in Table 14 as follows:

TABLE 14

| TCI sate 1 | TCI sate 2 | TCI sate 3 |
|---|---|---|
| RS1, RS2 | QCL-Type B | RS1, RS2 | QCL-Type D | RS3 | QCL-Type E |

In the foregoing example, the indication information includes three pieces of TCI state information. In an embodiment, TCI state 1 includes reference signals for Doppler property determination of the channel of the first signal, TCI state 2 includes reference signals for spatial receive parameter determination of the channel of the first signal, and TCI state 3 includes a reference signal for delay property determination of the channel of the first signal. The reference signal for delay property determination is the same as the reference signals for spatial receive parameter determination.

RS1, RS2 and RS3 are identification information of reference signals, the channel of RS1 and RS2 has an association relationship with the channel of the first signal in terms of the following large-scale property {Doppler shift, Doppler spread}, the terminal device can obtain {Doppler shift, Doppler spread} of the channel of the first signal according to the channel of RS1 and RS2. The channel of RS1 and RS2 has an association relationship with the channel of the first signal in terms of the spatial receive parameter, the terminal device can obtain the spatial receive parameter of the channel of the first signal according to the channel of RS1 and RS2. The terminal device can obtain the delay property of the channel of the first signal according to the delay property of the channel of RS3.

The above-described reference signal may be at least one of a CSI-RS for channel state information CSI acquisition, a synchronization signal and physical broadcast channel block SSB, and a TRS. For example, RS1 and RS2 can both be CSI-RSs, SSBs or TRSs; and RS1 and RS2 can also be two different reference signals, such as RS1 for the CSI-RS and RS2 for the SSB.

Example 15: in this example where the indication information includes three pieces of TCI state information, and the specific configuration can be shown in Table 15 as follows:

TABLE 15

| TCI sate 1 | TCI sate 2 | TCI sate 3 |
|---|---|---|
| RS1, RS2 | QCL-Type B | RS3, RS4 | QCL-Type D | RS5 | QCL-Type E |

In the foregoing example, the indication information includes three pieces of TCI state information. In an embodiment, TCI state 1 includes reference signals for Doppler property determination of the channel of the first signal, TCI state 2 includes reference signals for spatial receive parameter determination of the channel of the first signal, and TCI state 3 includes a reference signal for delay property determination of the channel of the first signal. This example differs from Example 14 in that, in the present example, the reference signal for delay property determination, the reference signals for spatial receive parameter determination and the reference signals for Doppler property determination are different from each other.

It should be understood that in the above examples, the number of TCI state information, as well as the number of reference signals configured in each piece of TCI state information and the corresponding QCL type are examples, in a specific implementation process, any number of TCI state information and reference signals can be set, and for the QCL type corresponding to the reference signals, it can also be set to other type. The above-described content is not limited in the embodiments of the present application.

With an example where the first reference signals are TRSs and the indication information includes two pieces of TCI state information and the first signal is a PDSCH, detailed description will be made hereunder to the process with regard to how the terminal device uses the first reference signals to perform channel estimation of the first signal.

Example 1: a network device transmits indication information to a terminal device, where the indication information includes two pieces of TCI state information, TCI state 1 includes a reference signal of QCL-type A, TCI state 2 includes a reference signal of QCL-type B, and the reference signals included in the two pieces of TCI state information are different, respectively TRS1 and TRS2. The specific configuration can be shown in Table 16:

TABLE 16

| TCI sate 1 | TCI sate 2 |
|---|---|
| TRS1 ǀ QCL-Type A | TRS2 ǀ QCL-Type B |

After receiving the above-described indication information, the terminal device can learn that the large-scale property {Doppler shift, Doppler spread, average delay, delay spread} of the channel experienced by each layer of the PDSCH is obtained through TRS1 and TRS2.

In addition, the network device will also transmit TRS1, TRS2 and PDSCH/DMRS to the terminal device, where TRS1 is transmitted from TRP1, TRS2 is transmitted from TRP2, the PDSCH and the DMRS corresponding to the PDSCH are transmitted from TRP1 and TRP2 simultaneously.

By performing channel estimation for TRS1 and TRS2 respectively, the terminal device can obtain Doppler shift of TRS1 and a corresponding weight as well as Doppler shift of TRS2 and a corresponding weight, and use the weights to weight the Doppler shift of TRS1 and the Doppler shift of TRS2, in this way, the terminal device can obtain an equivalent Doppler shift. Exemplarily, the terminal device may use this Doppler shift as input to solve a channel correlation coefficient, and a time domain correlation coefficient of the PDSCH channel can be obtained.

In addition, by performing channel estimation for TRS1 and TRS2 respectively, the terminal device can obtain a frequency domain correlation coefficient of the channel estimation corresponding to TRS1 as well as a frequency domain correlation coefficient of the channel estimation corresponding to TRS2. The frequency domain correlation coefficients are performed with linear superposition and a frequency domain correlation coefficient of the PDSCH channel can be obtained.

Further, the terminal device can perform channel estimation on the PDSCH according to the time domain correlation coefficient and the frequency domain correlation coefficient described above.

In the foregoing embodiment, the terminal device can determine the Doppler property of the PDSCH channel through reference signals, to improve the accuracy of the Doppler property; and furthermore, the channel estimation according to the Doppler property can improve the accuracy of the channel estimation.

Example 2: a network device transmits indication information to a terminal device, where the indication information includes two pieces of TCI state information, TCI state 1 includes a reference signal of QCL-type B and a reference signal of QCL-type E, TCI state 2 includes a reference signal of QCL-type B, and the reference signals included in the two pieces of TCI state information are different. The specific configuration can be shown in Table 17:

TABLE 17

| TCI sate 1 | TCI sate 2 |
|---|---|
| TRS1 ǀ QCL-Type E<br>TRS3 ǀ QCL-Type B | TRS2 ǀ QCL-Type B |

After receiving the above-described indication information, the terminal device can learn that the large-scale property {Doppler shift, Doppler spread} of the channel experienced by each layer of the PDSCH is obtained through TRS1 and TRS2.

In addition, the network device will also transmit TRS1, TRS2, TRS3 and PDSCH to the terminal device, where TRS1 is transmitted from TRP1, TRS2 is transmitted from TRP2, TRS3 and the PDSCH and the DMRS corresponding to the PDSCH are transmitted from TRP1 and TRP2 simultaneously.

By performing channel estimation for TRS1 and TRS2 respectively, the terminal device can obtain Doppler shift of TRS1 and a corresponding weight as well as Doppler shift of TRS2 and a corresponding weight, and use the weights to weight the Doppler shift of TRS1 and the Doppler shift of TRS2, in this way, the terminal device can obtain an equivalent Doppler shift. Exemplarily, the terminal device may use this Doppler shift as input to solve a channel correlation coefficient, and a time domain correlation coefficient of the PDSCH channel can be obtained.

In addition, by performing channel estimation for TRS3, the terminal device can obtain a frequency domain correlation coefficient of the channel estimation corresponding to TRS3. The frequency domain correlation coefficient is used as a frequency domain correlation coefficient of the PDSCH channel.

Further, the terminal device can perform channel estimation on the PDSCH according to the time domain correlation coefficient and the frequency domain correlation coefficient described above.

In the foregoing embodiment, the terminal device can determine the Doppler property of the PDSCH channel through reference signals, to improve the accuracy of the Doppler property; and furthermore, the channel estimation according to the Doppler property can improve the accuracy of the channel estimation.

According to the channel estimation method provided in the embodiments of the present application, a network device transmits indication information to a terminal device, where the indication information is used to indicate that a first signal and/or a first DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; the terminal device performs channel estimation of the first signal according to the indication information based on the plurality of first reference signals. Compared with the prior art, it is possible, in the present application, to perform channel estimation on a channel of a first signal through first reference signals; in case the channel is estimated through the plurality of first reference signals, a result of the channel estimation will be relatively accurate even if the terminal device is in a high-speed moving scenario, therefore, the performance of signal demodulation can be improved.

FIG. 3 is a schematic diagram illustrating a terminal device according to an embodiment of the present application. As shown in FIG. 3, a transceiver 300 is configured to receive and transmit data under control of a processor 310.

In FIG. 3, the bus architecture may include any number of interconnected buses and bridges, in particular, various circuits of one or more processors represented by the processor 310 and one or more memories represented by a memory 320 are linked together. The bus architecture can also link a variety of other circuits together, such as a peripheral device, a voltage regulator and a power management circuit, which are well known in the art and are therefore not described further in this document. The bus interface provides interfaces. The transceiver 300 can be elements, that is, including a transmitter and a receiver, and provide units for communicating with various other devices on transmission media, these transmission media include wireless channels, wired channels, optical cables and other transmission media. For different user devices, a user interface 330 can also be an interface externally and internally connecting desired devices, the connected devices include but are not limited to keypads, monitors, speakers, micro-phones, joysticks, etc.

The processor 310 is responsible for management of the bus architecture and common processing; the memory 320 is able to store the data used during execution of an operation by the processor 310.

In an embodiment, the processor 310 may be a central processing unit (CPU), an application specific integrated circuit (ASIC), a field-programmable gate array (FPGA) or a complex programmable logic device (CPLD). The processor can also be of a multi-core architecture.

The processor is configured to execute, according to an obtained executable instruction, any method provided in the embodiments of the present application, by calling a computer program stored in memory. The processor and the memory can also be physically separated.

The processor 310 is configured to read the computer program in the memory and execute operations of:

receiving indication information transmitted by a network device, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and performing, according to the indication information, channel estimation of the first signal based on the plurality of first reference signals.

In an embodiment, the processor 310 is configured to:

acquire at least one large-scale property of the channel of the first signal and/or a first DMRS port of the first signal according to the channels of the plurality of first reference signals, and/or, acquire at least one channel estimation parameter according to the channels of the plurality of first reference signals; and perform the channel estimation of the first signal according to the at least one large-scale property and/or the at least one channel estimation parameter.

In an embodiment, the first signal is a signal on an antenna port or a layer, and/or, the first reference signal is a signal on an antenna port.

In an embodiment, the channel of the first signal and/or the first DMRS port of the first signal is a channel on a same time-frequency resource block.

In an embodiment, the channel of the first signal is an equivalent channel corresponding to the channels of the plurality of first reference signals; or the channel of the first DMRS port of the first signal is an equivalent channel corresponding to the channels of the plurality of first reference signals.

In an embodiment, transmission antennas of the plurality of first reference signals are different, and the first signal is transmitted simultaneously on the transmission antennas respectively corresponding to the plurality of first reference signals.

In an embodiment, the processor 310 is configured to:

obtain an equivalent channel according to the channels of the plurality of first reference signals, and determine the at least one large-scale property of the channel of the first signal and/or the first DMRS port of the first signal according to the equivalent channel; or determine at least one large-scale property corresponding to a channel of each first reference signal according to the channels of the plurality of first reference signals, and determine the at least one large-scale property of the channel of the first signal and/or the first DMRS port of the first signal according to the at least one large-scale property corresponding to the channel of each first reference signal.

In an embodiment, the processor 310 is configured to:

obtain an equivalent channel according to the channels of the plurality of first reference signals, and determine at least one channel estimation parameter of the channel of the first signal and/or the first DMRS port of the first signal according to the equivalent channel; or determine at least one channel estimation parameter corresponding to a channel of each first reference signal according to the channels of the plurality of first reference signals, and determine the at least one channel estimation parameter of the channel of the first signal and/or the first DMRS port of the first signal according to the at least one channel estimation parameter corresponding to the channel of each first reference signal.

In an embodiment, the indication information includes identification of the plurality of first reference signals and a parameter used to indicate the at least one large-scale property.

In an embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In an embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In an embodiment, the at least one large-scale property includes Doppler property; the processor 310 is configured to:

determine a reference property of the channel of the first signal according to a second reference signal; where the second reference signal is part of or all of the plurality of first reference signals, or, the second reference signal

53 | 54 is a reference signal different from the plurality of first reference signals; the reference property is different from the Doppler property.

In an embodiment, the reference property includes delay property.

In an embodiment, the at least one large-scale property includes Doppler property; the processor 310 is configured to:

determine Doppler property of the channel of the first signal according to at least one first reference signal for which a corresponding QCL type is a first QCL type and at least one first reference signal for which a corresponding QCL type is a second QCL type; or determine the Doppler property of the channel of the first signal according to first reference signals for which a QCL type is the second QCL type; or determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In an embodiment, the processor 310 is configured to:

determine the reference property of the channel of the first signal according to second reference signals for which a QCL type is a first QCL type; or determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In an embodiment, the indication information includes at least one piece of transmission configuration indicator TCI state information, and the indication information includes identification information of the plurality of first reference signals, and the identification information of the plurality of first reference signals is contained in a same piece of TCI state information; or the indication information includes plural pieces of TCI state information, and the indication information includes identification information of the plurality of first reference signals, the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In an embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In an embodiment, the first signal is transmitted simultaneously from transmission/reception points TRPs, and the plurality of first reference signals are transmitted to different TRPs of the plurality of TRPs, respectively.

In an embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

It should be noted herein that the foregoing apparatus provided in the present application can implement all the method steps achieved by the foregoing method embodiments, and can achieve the same effect. For the same parts and beneficial effects as those in the method embodiments, detailed description are not described herein in the present embodiment.

Figure 4:
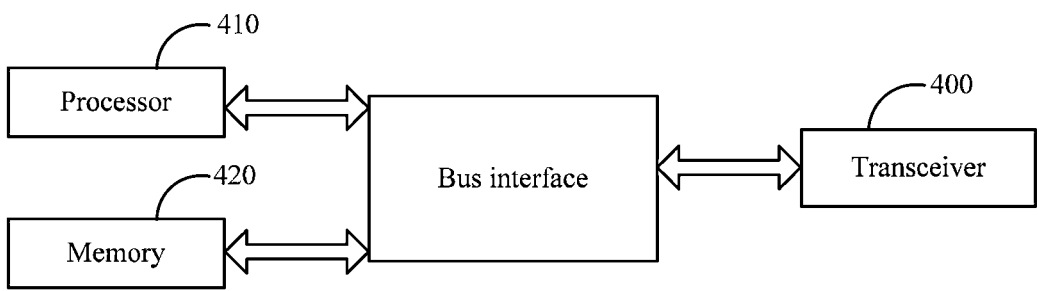
FIG. 4 is a schematic diagram illustrating a network device according to an embodiment of the present application.

FIG. 4 is a schematic diagram illustrating a network device according to an embodiment of the present application. As shown in FIG. 4, a transceiver 400 is configured to receive and transmit data under control of a processor 410.

In FIG. 4, the bus architecture may include any number of interconnected buses and bridges, in particular, various circuits of one or more processors represented by the processor 410 and one or more memories represented by a memory 420 are linked together. The bus architecture can also link a variety of other circuits together, such as a peripheral device, a voltage regulator and a power management circuit, which are well known in the art and are therefore not described further in this document. The bus interface provides interfaces. The transceiver 400 can be elements, that is, including a transmitter and a receiver, and provide units for communicating with various other devices on transmission media, these transmission media include wireless channels, wired channels, optical cables and other transmission media. The processor 410 is responsible for management of the bus architecture and common processing; the memory 420 is able to store the data used during execution of an operation by the processor 410.

The processor 410 may be a central processing unit (CPU), an application specific integrated circuit (ASIC), a field-programmable gate array (FPGA) or a complex programmable logic device (CPLD). The processor can also be of a multi-core architecture.

The processor 410 is configured to read the computer program in the memory and execute operations of:

determining indication information, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and transmitting the indication information to a terminal device, where the indication information is used to indicate the terminal device to perform channel estimation of the first signal based on the plurality of first reference signals.

In an embodiment, the first signal is a signal on an antenna port or a layer, and/or, the first reference signal is a signal on an antenna port.

In an embodiment, the channel of the first signal and/or the first DMRS port of the first signal is a channel on a same time-frequency resource block.

In an embodiment, the indication information is used to indicate that at least one large-scale property of a channel of a first signal is the same as at least one large-scale property of a joint channel composed of channels of first reference signals, and the channel of the first signal is an equivalent channel corresponding to the channels of the plurality of first reference signals;

the indication information is used to indicate that at least one large-scale property of a channel of a first demodulation reference signal DMRS port of the first signal is the same as at least one large-scale property of a joint channel composed of channels of first reference signals, and the channel of the first DMRS port of the first signal is an equivalent channel corresponding to the channels of the plurality of first reference signals.

In an embodiment, transmission antennas of the plurality of first reference signals are different, and the first signal is transmitted simultaneously on the transmission antennas respectively corresponding to the plurality of first reference signals.

In an embodiment, the channel of the first signal and/or the first DMRS port of the first signal is equal to a sum of channels of the plurality of first reference signals.

In an embodiment, the indication information includes identification of the plurality of first reference signals and a parameter used to indicate the at least one large-scale property.

In an embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In an embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In an embodiment, the at least one large-scale property includes Doppler property; the indication information is further used to indicate that the first signal or the first DMRS port is associated with a second reference signal in respect of a reference property of a channel, where the second reference signal is part of or all of the plurality of first reference signals, or, the second reference signal is a reference signal different from the plurality of first reference signals; the reference property is different from the Doppler property.

In an embodiment, the reference property includes delay property.

In an embodiment, the at least one large-scale property includes Doppler property; the indication information is further used to indicate the terminal device to determine Doppler property of the channel of the first signal according to at least one first reference signal for which a corresponding QCL type is a first QCL type and at least one first reference signal for which a corresponding QCL type is a second QCL type; or is further used to indicate the terminal device to determine the Doppler property of the channel of the first signal according to first reference signals for which a QCL type is the second QCL type; or is further used to indicate the terminal device to determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In an embodiment, the indication information is further used to indicate the terminal device to determine the reference property of the channel of the first signal according to second reference signals for which a QCL type is a first QCL type; or is further used to indicate the terminal device to determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In an embodiment, the indication information includes at least one piece of transmission configuration indicator TCI state information, and the indication information includes identification information of the plurality of first reference signals, then the identification information of the plurality of first reference signals is contained in the at least one piece of TCI state information; or the indication information includes plural pieces of TCI state information, and the indication information includes identification information of the plurality of first reference signals, then the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In an embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In an embodiment, the first signal is transmitted simultaneously from transmission/reception points TRPs, and the plurality of first reference signals are transmitted to different TRPs of the plurality of TRPs, respectively.

In an embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

It should be noted herein that the foregoing apparatus provided in the present application can implement all the method steps achieved by the foregoing method embodiments, and can achieve the same effect. For the same parts and beneficial effects as those in the method embodiments, detailed description are not described herein in the present embodiment.

Figure 5:
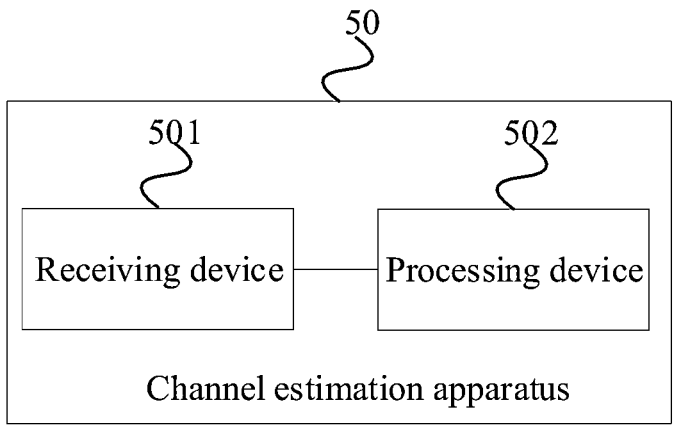
FIG. 5 is a schematic diagram illustrating a channel estimation apparatus according to an embodiment of the present application.

FIG. 5 is a schematic diagram illustrating a channel estimation apparatus according to an embodiment of the present application. Exemplarily, reference may be made to FIG. 5, the channel estimation apparatus 50 may include:

a receiving device 501, configured to receive indication information transmitted by a network device, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and a processing device 502, configured to perform, according to the indication information, channel estimation of the first signal based on the plurality of first reference signals.

In an embodiment, the processing device 502 is configured to:

acquire at least one large-scale property of the channel of the first signal and/or a first DMRS port of the first signal according to channels of the plurality of first reference signals, and/or, acquire at least one channel estimation parameter according to the channels of the plurality of first reference signals; and perform the channel estimation of the first signal according to the at least one large-scale property and/or the at least one channel estimation parameter.

In an embodiment, the first signal is a signal on an antenna port or a layer, and/or, the first reference signal is a signal on an antenna port.

In an embodiment, the channel of the first signal and/or the first DMRS port of the first signal is a channel on a same time-frequency resource block.

In an embodiment, the channel of the first signal is an equivalent channel corresponding to the channels of the plurality of first reference signals; or the channel of the first DMRS port of the first signal is an equivalent channel corresponding to the channels of the plurality of first reference signals.

In an embodiment, transmission antennas of the plurality of first reference signals are different, and the first signal is transmitted simultaneously on the transmission antennas respectively corresponding to the plurality of first reference signals.

In an embodiment, the processing device 502 is configured to:

obtain an equivalent channel according to the channels of the plurality of first reference signals, and determine the at least one large-scale property of the channel of the first signal and/or the first DMRS port of the first signal according to the equivalent channel; or determine at least one large-scale property corresponding to a channel of each first reference signal according to the channels of the plurality of first reference signals, and determine the at least one large-scale property of the channel of the first signal and/or the first DMRS port of the first signal according to the at least one large-scale property corresponding to the channel of each first reference signal.

In an embodiment, the processing device 502 is configured to:

obtain an equivalent channel according to the channels of the plurality of first reference signals, and determine at least one channel estimation parameter of the channel of the first signal and/or the first DMRS port of the first signal according to the equivalent channel; or determine at least one channel estimation parameter corresponding to a channel of each first reference signal according to the channels of the plurality of first reference signals, and determine the at least one channel estimation parameter of the channel of the first signal and/or the first DMRS port of the first signal according to the at least one channel estimation parameter corresponding to the channel of each first reference signal.

In an embodiment, the indication information includes identification of the plurality of first reference signals and a parameter used to indicate the at least one large-scale property.

In an embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In an embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In an embodiment, the at least one large-scale property includes Doppler property;

the processing device 502 is configured to:

determine a reference property of the channel of the first signal according to a second reference signal; where the second reference signal is part of or all of the plurality of first reference signals, or, the second reference signal is a reference signal different from the plurality of first reference signals; the reference property is different from the Doppler property.

In an embodiment, the reference property includes delay property.

In an embodiment, the at least one large-scale property includes Doppler property;

the processing device 502 is configured to:

determine Doppler property of the channel of the first signal according to at least one first reference signal for which a corresponding QCL type is a first QCL type and at least one first reference signal for which a corresponding QCL type is a second QCL type; or determine the Doppler property of the channel of the first signal according to first reference signals for which a QCL type is the second QCL type; or determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In an embodiment, the processing device 502 is configured to:

determine the reference property of the channel of the first signal according to second reference signals for which a QCL type is a first QCL type; or determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In an embodiment, the indication information includes at least one piece of transmission configuration indicator TCI state information, and the indication information includes identification information of the plurality of first reference signals, and the identification information of the plurality of first reference signals is contained in a same piece of TCI state information; or the indication information includes plural pieces of TCI state information, and the indication information includes identification information of the plurality of first reference signals, the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In an embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In an embodiment, the first signal is transmitted simultaneously from transmission/reception points TRPs, and the plurality of first reference signals are transmitted to different TRPs of the plurality of TRPs, respectively.

In an embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

It should be noted herein that the foregoing apparatus provided in the present application can implement all the method steps achieved by the foregoing method embodiments, and can achieve the same effect. For the same parts and beneficial effects as those in the method embodiments, detailed description are not described herein in the present embodiment.

Figure 6:
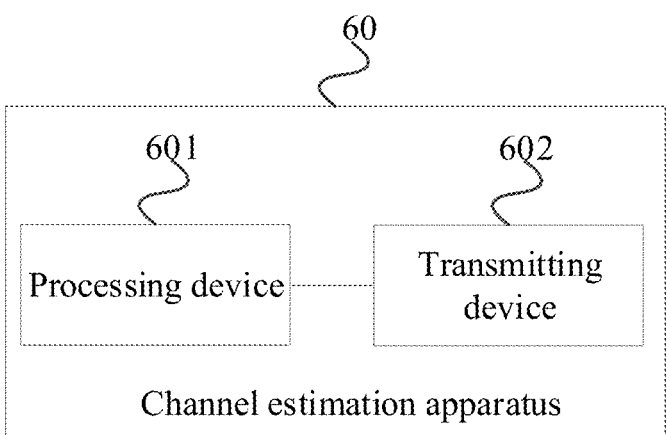
FIG. 6 is a schematic diagram illustrating another channel estimation apparatus according to an embodiment of the present application.

FIG. 6 is a schematic diagram illustrating another channel estimation apparatus according to an embodiment of the present application. Exemplarily, reference may be made to FIG. 6, the channel estimation apparatus 60 may include:

a processing device 601, configured to determine indication information, where the indication information is used to indicate that a first signal and/or a first demodulation reference signal DMRS port of the first signal satisfy a first quasi co-location QCL relationship with first reference signals, and the first QCL relationship includes that a channel of the first signal and/or a channel of the first DMRS port is associated with at least one large-scale property of channels of the plurality of first reference signals; and a transmitting device 602, configured to transmit the indication information to a terminal device, where the indication information is used to indicate the terminal device to perform channel estimation of the first signal based on the plurality of first reference signals.

In an embodiment, the first signal is a signal on an antenna port or a layer, and/or, the first reference signal is a signal on an antenna port.

In an embodiment, the channel of the first signal and/or the first DMRS port of the first signal is a channel on a same time-frequency resource block.

In an embodiment, the indication information is used to indicate that at least one large-scale property of a channel of a first signal is the same as at least one large-scale property of a joint channel composed of channels of first reference signals, and the channel of the first signal is an equivalent channel corresponding to the channels of the plurality of first reference signals;

the indication information is used to indicate that at least one large-scale property of a channel of a first demodulation reference signal DMRS port of the first signal is the same as at least one large-scale property of a joint channel composed of channels of first reference signals, and the channel of the first DMRS port of the first signal is an equivalent channel corresponding to the channels of the plurality of first reference signals.

In an embodiment, transmission antennas of the plurality of first reference signals are different, and the first signal is transmitted simultaneously on the transmission antennas respectively corresponding to the plurality of first reference signals.

In an embodiment, the channel of the first signal and/or the first DMRS port of the first signal is equal to a sum of channels of the plurality of first reference signals.

In an embodiment, the indication information includes identification of the plurality of first reference signals and a parameter used to indicate the at least one large-scale property.

In an embodiment, an indication manner of the indication information includes:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

In an embodiment, the parameter used to indicate the large-scale property is a QCL type, the indication information includes at least two QCL types, and the at least two QCL types include at least one of the following:

a first QCL type and a second QCL type;

a first QCL type, a second QCL type and a third QCL type;

a second QCL type and a fourth QCL type; and a second QCL type, a third QCL type and a fourth QCL type;

where the first QCL type includes Doppler shift, Doppler spread, average delay and delay spread;

the second QCL type includes Doppler shift and Doppler spread;

the third QCL type includes spatial receive parameter; and the fourth QCL type includes average delay and delay spread.

In an embodiment, the at least one large-scale property includes Doppler property; the indication information is further used to indicate that the first signal or the first DMRS port is associated with a second reference signal in respect of a reference property of a channel, where the second reference signal is part of or all of the plurality of first reference signals, or, the second reference signal is a reference signal different from the plurality of first reference signals; the reference property is different from the Doppler property.

In an embodiment, the reference property includes delay property.

In an embodiment, the at least one large-scale property includes Doppler property; the indication information is further used to indicate the terminal device to determine Doppler property of the channel of the first signal according to at least one first reference signal for which a corresponding QCL type is a first QCL type and at least one first reference signal for which a corresponding QCL type is a second QCL type; or is further used to indicate the terminal device to determine the Doppler property of the channel of the first signal according to first reference signals for which a QCL type is the second QCL type; or is further used to indicate the terminal device to determine the Doppler property of the channel of the first signal according to first reference signals for which a QCL type is the first QCL type;

where the QCL type is a parameter used to indicate a large-scale property, a large-scale property indicated by the first QCL type includes Doppler shift, Doppler spread, average delay and delay spread, and a large-scale property indicated by the second QCL type includes Doppler shift and Doppler spread.

In an embodiment, the indication information is further used to indicate the terminal device to determine the reference property of the channel of the first signal according to second reference signals for which a QCL type is a first QCL type; or is further used to indicate the terminal device to determine the reference property of the channel of the first signal according to second reference signals for which a QCL type is a fourth QCL type;

where the QCL type is a parameter used to indicate a large-scale property, a large-scale property indicated by the first QCL type includes Doppler shift, Doppler spread, average delay and delay spread, and a large-scale property indicated by the fourth QCL type includes the average delay and the delay spread.

In an embodiment, the indication information includes at least one piece of transmission configuration indicator TCI state information, and the indication information includes identification information of the plurality of first reference signals, then the identification information of the plurality of first reference signals is contained in the at least one piece of TCI state information; or the indication information includes plural pieces of TCI state information, and the indication information includes identification information of the plurality of first reference signals, then the identification information of the plurality of first reference signals is contained in the plural pieces of TCI state information, where each piece of TCI state information at most includes identification information of one of the first reference signals; or the indication information includes at least one piece of TCI state information, where each piece of TCI state information includes one or more pieces of large-scale property indication information, and in case plural pieces of TCI state information are included, a different piece of TCI state information includes large-scale property indication information indicating a different large-scale property.

In an embodiment, the first signal includes at least one of the following signals:

a physical downlink shared channel PDSCH, a physical downlink control channel PDCCH, a demodulation reference signal DMRS, a channel state information reference signal CSI-RS, a tracking reference signal TRS, a physical uplink shared channel PUSCH, a physical uplink control channel PUCCH, and a sounding reference signal SRS.

In an embodiment, the first signal is transmitted simultaneously from transmission/reception points TRPs, and the plurality of first reference signals are transmitted to different TRPs of the plurality of TRPs, respectively.

In an embodiment, all the first reference signals have a same signal type; or, at least part of the first reference signals has a different signal type;

where the first reference signals have at least one of the following signal types:

a CSI-RS for channel state information CSI acquisition;

a synchronization signal and physical broadcast channel block SSB;

a CSI-RS for beam management; and a TRS.

It should be noted herein that the foregoing apparatus provided in the present application can implement all the method steps achieved by the foregoing method embodiments, and can achieve the same effect. For the same parts and beneficial effects as those in the method embodiments, detailed description are not described herein in the present embodiment.

It should be noted that the division of the units in the embodiments of the present application is merely exemplary, and is a division of logical functions, moreover, there may be other divisions during actual implementations. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

In case the integrated unit is implemented in a form of a software functional unit and sold or used as an independent product, the integrated unit may be stored in a processor-readable storage medium. Based on such understanding, the embodiments of the present application essentially, or the part contributing to the prior art, or all or a part of the embodiments may be embodied in a form of a software product. The computer software product is stored in a storage medium, and includes several instructions for instructing a computer device (which may be a personal computer, a server, or a network device) or a processor to perform all or a part of the steps of the methods described in the embodiments of the present application. The foregoing storage medium includes: any medium capable of storing program codes, such as a USB flash disk, a mobile hard disk, a read-only memory (ROM), a random access memory (RAM), a magnetic disk, or an optical disc.

An embodiment of the present application further provides a processor-readable storage medium. The processor-readable storage medium has, stored therein, a computer program enabling the processor to perform the channel estimation method described in the foregoing method embodiments.

The processor-readable storage medium may be any available media or data storage device accessible to the processor, including but not limited to a magnetic memory (such as a floppy disk, a hard disk, a magnetic tape, a magnetic optical disk (MO) or the like), an optical memory (such as a compact disc (CD), a Digital Video Disk (DVD), a Blu-ray Disc (BD), an High-definition Versatile Disc (HVD) or the like), and a semiconductor memory (such as a ROM, an erasable programmable read-only memory (EPROM), an electrically erasable programmable read-only memory EEPROM, a non-volatile memory (NAND FLASH), a solid-state disk (SSD)) and the like.

The embodiments of the present application may be provided as methods, systems, or computer program products. Accordingly, the present application may take the form of complete hardware embodiments, complete software embodiments, or a combination of software and hardware embodiments. Further, the present application may take the form of computer program products implemented on one or more computer-usable storage media (including but not limited to disk memories and optical memories, etc.) containing computer-usable program codes.

The present application is described with reference to flow charts and/or block diagrams of a method, a device (system) and a computer program product according to embodiments of the present application. It will be appreciated that computer-executable instructions can implement each flow and/or block in the flow charts and/or the block diagrams, and a combination of a flow and/or a block in the flow charts and/or the block diagrams. These computer-executable instructions may be provided to a processor of a general purpose computer, a special purpose computer, an embedded processor or other programmable data processing devices to generate a machine, and instructions executed by the processor of the computers or other programmable data processing devices generate a device for performing functions specified in one or more flows of the flow charts and/or one or more blocks of the block diagrams.

These processor-executable instructions may also be stored in a processor-readable memory capable of directing the computers or other programmable data processing devices to operate in a specific manner, and instructions stored in the processor-readable memory generate a manufactured product including an instruction device, where the instruction device performs functions specified in one or more flows of the flow charts and/or one or more blocks of the block diagrams.

These processor-executable instructions may also be loaded on the computers or other programmable data processing devices, and a series of operation steps are performed in the computers or other programmable devices to generate a computed implemented process, and thus the instructions executed on the computers or other programmable devices provide steps for performing the functions specified in one or more flows of the flow charts and/or one or more blocks of the block diagrams.

The invention claimed is:

1. A channel estimation method, comprising:

receiving indication information transmitted by a network device, wherein the indication information is used to indicate that at least one of a first signal or a first demodulation reference signal (DMRS) port of the first signal satisfy a first quasi co-location (QCL) relationship with a plurality of first reference signals, and the first QCL relationship comprises that at least one of a channel of the first signal or a channel of the first DMRS port is associated with channels of the plurality of first reference signals in respect of at least one large-scale property; and performing, according to the indication information, channel estimation of the first signal based on the plurality of first reference signals;

wherein the indication information comprises at least one piece of transmission configuration indicator (TCI) state information, and the indication information comprises identification information of the plurality of first reference signals and a parameter used to indicate the at least one large-scale property, and the identification information of the plurality of first reference signals is contained in a same piece of TCI state information; or the indication information comprises plural pieces of TCI state information, and the indication information comprises identification information of the plurality of first reference signals and a parameter used to indicate the at least one large-scale property, the identification information of the plurality of first reference signals is contained in the plural pieces of TCI state information, wherein each piece of TCI state information at most comprises identification information of one of the first reference signals; or the indication information comprises at least one piece of TCI state information, wherein each piece of TCI state information comprises one or more pieces of large-scale property indication information, and in case plural pieces of TCI state information are comprised, a different piece of TCI state information comprises large-scale property indication information indicating a different large-scale property;

wherein the at least one large-scale property comprises Doppler property, the method further comprises:

determining a reference property of the channel of the first signal according to a second reference signal, wherein the second reference signal is part of the plurality of first reference signals; or determining a reference property of the channel of the first signal according to a second reference signal, wherein the second reference signal is a reference signal different from the plurality of first reference signals;

wherein the reference property is different from the Doppler property and the reference property comprises a delay property.

2. The method according to claim 1, wherein the performing the channel estimation of the first signal based on the plurality of first reference signals comprises performing at least one of:

acquiring at least one large-scale property of the channel of at least one of the first signal or the first DMRS port of the first signal according to the channels of the plurality of first reference signals, or, acquiring at least one channel estimation parameter according to the channels of the plurality of first reference signals; or performing the channel estimation of the first signal according to at least one of the at least one large-scale property or the at least one channel estimation parameter.

3. The method according to claim 1, wherein the channel of at least one of the first signal or the first DMRS port of the first signal is a channel on a same time-frequency resource block.

4. The method according to claim 1, wherein transmission antennas of the plurality of first reference signals are different, and the first signal is transmitted simultaneously on the transmission antennas respectively corresponding to the plurality of first reference signals.

5. The method according to claim 1, wherein an indication manner of the indication information comprises:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

6. The method according to claim 5, wherein the parameter used to indicate the large-scale property is a QCL type, the indication information comprises at least two QCL types, and the at least two QCL types comprise at least one of the following:

a first QCL type and a second QCL type;

a first QCL type, a second QCL type and a third QCL type;

a second QCL type and a fourth QCL type; or a second QCL type, a third QCL type and a fourth QCL type;

wherein the first QCL type comprises Doppler shift, Doppler spread, average delay and delay spread;

the second QCL type comprises Doppler shift and Doppler spread;

the third QCL type comprises spatial receive parameter; and the fourth QCL type comprises average delay and delay spread.

7. The method according to claim 1, wherein the method further comprises:

determining Doppler property of the channel of the first signal according to at least one first reference signal for which a corresponding QCL type is a first QCL type and at least one first reference signal for which a corresponding QCL type is a second QCL type; or determining the Doppler property of the channel of the first signal according to a plurality of first reference signals for which a QCL type is the second QCL type; or determining the Doppler property of the channel of the first signal according to a plurality of first reference signals for which a QCL type is the first QCL type;

wherein the QCL type is a parameter used to indicate a large-scale property, a large-scale property indicated by the first QCL type comprises Doppler shift, Doppler spread, average delay and delay spread, and a large-scale property indicated by the second QCL type comprises Doppler shift and Doppler spread.

8. The method according to claim 1, wherein the determining the reference property of the channel of the first signal according to the second reference signal comprises:

determining the reference property of the channel of the first signal according to a plurality of second reference signals for which a QCL type is a first QCL type; or determining the reference property of the channel of the first signal according to a plurality of second reference signals for which a QCL type is a fourth QCL type;

wherein the QCL type is a parameter used to indicate a large-scale property, a large-scale property indicated by the first QCL type comprises Doppler shift, Doppler spread, average delay and delay spread, and a large-scale property indicated by the fourth QCL type comprises the average delay and the delay spread.

9. A channel estimation method, comprising:

determining indication information, wherein the indication information is used to indicate that at least one of a first signal or a first demodulation reference signal (DMRS) port of the first signal satisfy a first quasi co-location (QCL) relationship with a plurality of first reference signals, and the first QCL relationship comprises that at least one of a channel of the first signal or a channel of the first DMRS port is associated with channels of the plurality of first reference signals in respect of at least one large-scale property; and transmitting the indication information to a terminal device, wherein the indication information is used to indicate the terminal device to perform channel estimation of the first signal based on the plurality of first reference signals;

wherein the indication information comprises at least one piece of transmission configuration indicator (TCI) state information, and the indication information comprises identification information of the plurality of first reference signals and a parameter used to indicate the at least one large-scale property, and the identification information of the plurality of first reference signals is contained in a same piece of TCI state information; or the indication information comprises plural pieces of TCI state information, and the indication information comprises identification information of the plurality of first reference signals and a parameter used to indicate the at least one large-scale property, the identification information of the plurality of first reference signals is contained in the plural pieces of TCI state information, wherein each piece of TCI state information at most comprises identification information of one of the first reference signals; or the indication information comprises at least one piece of TCI state information, wherein each piece of TCI state information comprises one or more pieces of large-scale property indication information, and in case plural pieces of TCI state information are comprised, a different piece of TCI state information comprises large-scale property indication information indicating a different large-scale property;

wherein the at least one large-scale property comprises Doppler property; wherein the indication information is further used to indicate that the first signal or the first DMRS port is associated with a second reference signal in respect of a reference property of a channel, wherein the second reference signal is part of the plurality of first reference signals; or the indication information is further used to indicate that the first signal or the first DMRS port is associated with a second reference signal in respect of a reference property of a channel, wherein the second reference signal is a reference signal different from the plurality of first reference signals;

wherein the reference property is different from the Doppler property and the reference property comprises a delay property.

10. The method according to claim 9, wherein transmission antennas of the plurality of first reference signals are different, and the first signal is transmitted simultaneously on the transmission antennas respectively corresponding to the plurality of first reference signals.

11. The method according to claim 9, wherein an indication manner of the indication information comprises:

indicating, respectively for each first reference signal of the plurality of first reference signals, a parameter used to indicate a corresponding large-scale property of the first reference signal; or indicating at least one parameter used to indicate a large-scale property, and indicating, respectively for each parameter used to indicate the large-scale property, a first reference signal corresponding to the parameter.

12. The method according to claim 11, wherein the parameter used to indicate the large-scale property is a QCL type, the indication information comprises at least two QCL types, and the at least two QCL types comprise at least one of the following:

a first QCL type and a second QCL type;
a first QCL type, a second QCL type and a third QCL type;

a second QCL type and a fourth QCL type; or
a second QCL type, a third QCL type and a fourth QCL type;

wherein the first QCL type comprises Doppler shift, Doppler spread, average delay and delay spread;

the second QCL type comprises Doppler shift and Doppler spread;

the third QCL type comprises spatial receive parameter; and the fourth QCL type comprises average delay and delay spread.

13. The method according to claim 9, wherein the indication information is further used to indicate the terminal device to determine Doppler property of the channel of the first signal according to at least one first reference signal for which a corresponding QCL type is a first QCL type and at least one first reference signal for which a corresponding QCL type is a second QCL type; or is further used to indicate the terminal device to determine the Doppler property of the channel of the first signal according to a plurality of first reference signals for which a QCL type is the second QCL type; or is further used to indicate the terminal device to determine the Doppler property of the channel of the first signal according to a plurality of first reference signals for which a QCL type is the first QCL type;

wherein the QCL type is a parameter used to indicate a large-scale property, a large-scale property indicated by the first QCL type comprises Doppler shift, Doppler spread, average delay and delay spread, and a large-scale property indicated by the second QCL type comprises Doppler shift and Doppler spread.

14. The method according to claim 9, wherein the indication information is further used to indicate the terminal device to determine the reference property of the channel of the first signal according to a plurality of second reference signals for which a QCL type is a first QCL type; or is further used to indicate the terminal device to determine the reference property of the channel of the first signal according to a plurality of second reference signals for which a QCL type is a fourth QCL type;

wherein the QCL type is a parameter used to indicate a large-scale property, a large-scale property indicated by the first QCL type comprises Doppler shift, Doppler spread, average delay and delay spread, and a large-scale property indicated by the fourth QCL type comprises the average delay and the delay spread.

15. A terminal device, comprising: a memory, a transceiver and a processor, wherein the memory is configured to store a computer program; the transceiver is configured to transmit and receive data under control of the processor; the processor is configured to read the computer program in the memory and execute operations of:

receiving indication information transmitted by a network device, wherein the indication information is used to indicate that at least one of a first signal or a first demodulation reference signal (DMRS) port of the first signal satisfy a first quasi co-location (QCL) relationship with a plurality of first reference signals, and the first QCL relationship comprises that at least one of a channel of the first signal or a channel of the first DMRS port is associated with channels of the plurality of first reference signals in respect of at least one large-scale property; and performing, according to the indication information, channel estimation of the first signal based on the plurality of first reference signals;

wherein the indication information comprises at least one piece of transmission configuration indicator (TCI) state information, and the indication information comprises identification information of the plurality of first reference signals and a parameter used to indicate the at least one large-scale property, and the identification information of the plurality of first reference signals is contained in a same piece of TCI state information; or the indication information comprises plural pieces of TCI state information, and the indication information comprises identification information of the plurality of first reference signals and a parameter used to indicate the at least one large-scale property, the identification information of the plurality of first reference signals is contained in the plural pieces of TCI state information, wherein each piece of TCI state information at most comprises identification information of one of the first reference signals; or the indication information comprises at least one piece of TCI state information, wherein each piece of TCI state information comprises one or more pieces of large-scale property indication information, and in case plural pieces of TCI state information are comprised, a different piece of TCI state information comprises large-scale property indication information indicating a different large-scale property;

wherein the at least one large-scale property comprises Doppler property, the processor is further configured to read the computer program in the memory and execute operations of:

determining a reference property of the channel of the first signal according to a second reference signal; wherein the second reference signal is part of the plurality of first reference signals; or determining a reference property of the channel of the first signal according to a second reference signal; wherein the second reference signal is a reference signal different from the plurality of first reference signals;

wherein the reference property is different from the Doppler property and the reference property comprises a delay property.

16. A network device, comprising: a memory, a transceiver and a processor, wherein the memory is configured to store a computer program; the transceiver is configured to transmit and receive data under control of the processor; the processor is configured to read the computer program in the memory and execute the method according to claim 9.

* * * * *